(12) United States Patent
Milstein et al.

(10) Patent No.: US 12,312,240 B2
(45) Date of Patent: May 27, 2025

(54) REVERSIBLE LIQUID ORGANIC SYSTEM, METHOD AND PROCESS FOR LOADING AND DISCHARGING HYDROGEN BASED ON N-HETEROCYCLES

(71) Applicant: YEDA RESEARCH AND DEVELOPMENT CO. LTD., Rehovot (IL)

(72) Inventors: David Milstein, Rehovot (IL); Yinjun Xie, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 958 days.

(21) Appl. No.: 17/427,929

(22) PCT Filed: Feb. 6, 2020

(86) PCT No.: PCT/IL2020/050153
§ 371 (c)(1),
(2) Date: Aug. 3, 2021

(87) PCT Pub. No.: WO2020/161723
PCT Pub. Date: Aug. 13, 2020

(65) Prior Publication Data
US 2022/0024758 A1    Jan. 27, 2022

(30) Foreign Application Priority Data
Feb. 6, 2019    (IL) .......................................... 264702

(51) Int. Cl.
*C01B 3/00* (2006.01)

(52) U.S. Cl.
CPC .... *C01B 3/0015* (2013.01); *C01B 2203/0277* (2013.01)

(58) Field of Classification Search
CPC .......... C01B 3/0015; C01B 2203/0277; C01B 2203/1252; C01B 3/22; C01B 3/26
See application file for complete search history.

(56) References Cited

U.S. PATENT DOCUMENTS 2,765,311 A   10/1956   Horrobin et al.
4,317,946 A    3/1982   Costa
(Continued)

FOREIGN PATENT DOCUMENTS

EP           3511294 A1 *  7/2019   ........... C01B 3/0005
WO      WO 2016/035081       3/2016
(Continued)

OTHER PUBLICATIONS

Sordakis et al. "Homogeneous Catalysis for Sustainable Hydrogen Storage in Formic Acid and Alcohols" Chem. Rev. 2018, 118, 372-433 (Year: 2018).*
(Continued)

*Primary Examiner* — Wayne A Langel
*Assistant Examiner* — Syed T Iqbal
(74) *Attorney, Agent, or Firm* — Mark S. Cohen; Pearl Cohen; ZEDEK LATZER BARATZ LLP

(57) ABSTRACT

The present invention provides a system, a process and a method of storing hydrogen ($H_2$) and releasing it on demand, comprising and making use of N-heterocycles as liquid organic hydrogen carriers (LOHCs).

35 Claims, 10 Drawing Sheets

| | | | | | |
|---|---|---|---|---|---|
| $H_2$-rich | (piperidine) | (2-methylpiperidine) | (3-aminomethylpiperidine) | (4-aminopiperidine) | (2,6-dimethylpiperidine) |
| m.p.: | -7 °C | -5 °C | -27 °C | N.A. | -63 °C |
| b.p.: | 106 °C | 119 °C | 125 °C | 126 °C | 126-139°C |
| $H_2$-lean | (pyridine) | (2-methylpyridine) | (3-methylpyridine) | (4-methylpyridine) | (2,6-dimethylpyridine) |
| m.p.: | -42 °C | -70 °C | -19 °C | 2.4 °C | -6 °C |
| b.p.: | 115 °C | 129 °C | 144 °C | 145 °C | 144 °C |
| HSC: | 7.1 wt% | 6.1 wt% | 6.1 wt% | 6.1 wt% | 5.3 wt% |

(56) References Cited

U.S. PATENT DOCUMENTS

| | | | |
|---|---|---|---|
| 4,401,819 | A | 8/1983 | Cordier et al. |
| 7,101,530 | B2 | 9/2006 | Pez et al. |
| 7,351,395 | B1 * | 4/2008 | Pez ........................... C01B 3/26 423/644 |
| 2005/0002857 | A1 | 1/2005 | Pez et al. |
| 2010/0022791 | A1 | 1/2010 | Ihm et al. |
| 2011/0092711 | A1 | 4/2011 | Pianzola et al. |
| 2013/0281664 | A1 | 10/2013 | Milstein et al. |
| 2017/0107251 | A1 | 4/2017 | Milstein et al. |
| 2017/0283257 | A1 | 10/2017 | Milstein et al. |

FOREIGN PATENT DOCUMENTS

| | | | |
|---|---|---|---|
| WO | WO 2018/048058 | 3/2018 | |
| WO | WO-2018048058 A1 * | 3/2018 | ........... C01B 3/0005 |

OTHER PUBLICATIONS

Aakko-Saksa et al. (2018). Liquid organic hydrogen carriers for transportation and storing of renewable energy—Review and discussion. *Journal of Power Sources*, 396, 803-823.

Armarego et al. (2000). Purification of Laboratory Chemicals, 4th Edition; Butterworth-Heineman: Oxford.pp 223, 273,361 and 381.

Bellows et al. (2017). Anuncanny dehydrogenation mechanism; polar bond control over stepwise or concerted transition states. Inorganic chemistry, 56(10), 5519-5524.

Bockris. (2013). The hydrogen economy: Its history. International Journal of Hydrogen Energy, 38(6), 2579-2588.

Bockris JM. "A Hydrogen Economy" Science. Jun. 23, 1972;176 (4041):1323.

Boddien et al. (2011). Efficient dehydrogenation of formic acid using an iron catalyst. *Science*, 333(6050), 1733-1736.

BP Energy Outlook. 2018, pp. 1-125.

Calbo et al. (2015). The Nonlocal Correlation Density Functional VV10: A Successful Attempt to Accurately Capture Noncovalent Interactions. In Annual *Reports in Computational Chemistry* (vol. 11, pp. 37-102). Elsevier.

Chiron et al. (2003). Reactivity of the acridine ring: One-pot regioselective single and double bromomethylation of acridine and some derivatives. *Synlett*, 2003(15), 2349-2350.

Cui et al., (2008). The effect of substitution on the utility of piperidines and octahydroindoles for reversible hydrogen storage. New Journal of Chemistry, 32(6), 1027-103.

Chu et al. (2012). Opportunities and challenges for a sustainable energy future. nature, 488(7411), 294-303.

Chakraborty et al. (2014). A molecular iron catalyst for the acceptorless dehydrogenation and hydrogenation of N-heterocycles. Journal of the American Chemical Society, 136(24), 8564-8567.

Cortright et al. (2002). Hydrogen from catalytic reforming of biomass-derived hydrocarbons in liquid water. Nature, 418(6901), 964-968.

Crabtree. (2017). Nitrogen-containing liquid organic hydrogen carriers: progress and prospects.4491-4498.

Crabtree. (2017). Homogeneous transition metal catalysis of acceptorless dehydrogenative alcohol oxidation: applications in hydrogen storage and to heterocycle synthesis. *Chemical reviews*, 117(13), 9228-9246.

Dalebrook et al. (2013). Hydrogen storage: beyond conventional methods. Chemical Communications, 49(78), 8735-8751.

Dean et al. (2011). The effect of temperature, catalyst and sterics on the rate of N-heterocycle dehydrogenation for hydrogen storage. New Journal of Chemistry, 35(2), 417-422.

DOE (2016). Technical Targets for Onboard Hydrogen Storage for Light-Duty Vehicles; U.S. DOE: Washington, D.C pp. 1-5.

Dohm et al. (2018). Comprehensive thermochemical benchmark set of realistic closed-shell metal organic reactions. *Journal of chemical theory and computation*, 14(5), 2596-2608.

Drive, U. S. (2015). Target explanation document: onboard hydrogen storage for light-duty fuel cell vehicles, pp. 1-22.

Eberle et al. (2012). Fuel cell electric vehicles and hydrogen infrastructure: status 2012. *Energy & Environmental Science*, 5(10), 8780-8798.

Eberle et al. (2009). Chemical and physical solutions for hydrogen storage. *Angewandte Chemie International Edition*, 48(36), 6608-6630.

Esteruelas et al. (2017). Osmium Hydride Acetylacetonate Complexes and Their Application in Acceptorless Dehydrogenative Coupling of Alcohols and Amines and for the Dehydrogenation of Cyclic Amines. Organometallics, 36(15), 2996-3004.

Fogler et al. (2014). System with Potential Dual Modes of Metal-Ligand Cooperation: Highly Catalytically Active Pyridine-Based PNNH-Ru Pincer Complexes. *Chemistry—A European Journal*, 20(48), 15727-15731.

Forberg et al. (2016). Single-catalyst high-weight% hydrogen storage in an N-heterocycle synthesized from lignin hydrogenolysis products and ammonia. Nature communications, 7, 13201, pp. 1-6.

FCH, J. (2014).Fuel Cells and Hydrogen Joint Undertaking (FCH2 JU) Governing Board. Multi-Annual Work Plan 2014-2020; FCH2 JU: Brussels, Belgium, pp. 1-79.

Fujita et al. (2014). Homogeneous perdehydrogenation and perhydrogenation of fused bicyclic N-heterocycles catalyzed by iridium complexes bearing a functional bipyridonate ligand. Journal of the American Chemical Society, 136(13), 4829-4832.

Fujita et al. (2017). Reversible Interconversion between 2, 5-Dimethylpyrazine and 2, 5-Dimethylpiperazine by Iridium-Catalyzed Hydrogenation/Dehydrogenation for Efficient Hydrogen Storage. *Angewandte Chemie International Edition*, 56(36), 10886-10889.

Gellrich et al. (2015). Mechanistic investigations of the catalytic formation of lactams from amines and water with liberation of H2. Journal of the American Chemical Society, 137(14), 4851-4859.

Gianotti et al. (2018). High-purity hydrogen generation via dehydrogenation of organic carriers: a review on the catalytic process. ACS Catalysis, 8(5), 4660-4680.

Gnanaprakasam et al. (2010). Direct synthesis of imines from alcohols and amines with liberation of H2. Angewandte Chemie International Edition, 49(8), 1468-1471.

Gottlieb et al. (1997). NMR chemical shifts of common laboratory solvents as trace impurities. Journal of Organic Chemistry, 62(21), 7512-7515.

Grimme et al. (2010). A consistent and accurate ab initio parametrization of density functional dispersion correction (DFT-D) for the 94 elements H—Pu. The Journal of chemical physics, 132(15), 154104.

Gunanathan et al. (2007). Direct synthesis of amides from alcohols and amines with liberation of H2. Science, 317(5839), 790-792.

Gunanathan et al. (2013). Applications of acceptorless dehydrogenation and related transformations in chemical synthesis. Science, 341(6143).

Gunanathan et al. (2008). Selective synthesis of primary amines directly from alcohols and ammonia. Angewandte Chemie (International ed. in English), 47(45), 8661-8664.

Gunanathan et al. (2010). "Long-Range" Metal-Ligand Cooperation in H2 Activation and Ammonia-Promoted Hydride Transfer with a Ruthenium-Acridine Pincer Complex. Journal of the American Chemical Society, 132(42), 14763-14765.

He et al. (2015). Liquid organic hydrogen carriers. Journal of energy chemistry, 24(5), 587-594.

He et al. (2016). Hydrogen carriers. Nature Reviews Materials, 1(12), 16059, pp. 1-17.

Heim et al. (2014). Selective and mild hydrogen production using water and formaldehyde. Nature communications, 5(1), 1-8.

Höök et al. (2013). Depletion of fossil fuels and anthropogenic climate change—A review. Energy policy, 52, 797-809.

Hu et al. (2015). A novel liquid organic hydrogen carrier system based on catalytic peptide formation and hydrogenation. Nature communications, 6(1), 1-7.

Hu et al. (2016). Rechargeable Hydrogen Storage System Based on the Dehydrogenative Coupling of Ethylenediamine with Ethanol. Angewandte Chemie (International ed. in English), 55(3), 1061-1064.

(56) References Cited

OTHER PUBLICATIONS

Huber et al. (2003). Raney Ni—Sn catalyst for H2 production from biomass-derived hydrocarbons. Science, 300(5628), 2075-2077.
Hull et al. (2012). Reversible hydrogen storage using CO 2 and a proton-switchable iridium catalyst in aqueous media under mild temperatures and pressures. Nature chemistry, 4(5), 383.
International Search Report for PCT Application No. PCT/IL2020/050153 dated May 19, 2020.
International Search Report for PCT Application No. PCT/IL2019/051440 dated Mar. 10, 2020.
Johnson et al. (2010). Hydrogen generation from formic acid and alcohols using homogeneous catalysts. Chemical Society Reviews, 39(1), 81-88.
Jones LW. (1971). Liquid hydrogen as a fuel for the future. Science, 174(4007), 367-370.
Kothandaraman et al.. (2017). Efficient reversible hydrogen carrier system based on amine reforming of methanol. Journal of the American Chemical Society, 139(7), 2549-2552.
Kumar et al. (2018). Selective hydrogenation of cyclic imides to diols and amines and its application in the development of a liquid organic hydrogen carrier. Journal of the American Chemical Society, 140(24), 7453-7457.
Li et al. Y. (2015). Ruthenium-catalyzed hydrogen generation from glycerol and selective synthesis of lactic acid. Green Chemistry, 17(1), 193-198.
Lin et al. (2017). Low-temperature hydrogen production from water and methanol using Pt/α-MoC catalysts. Nature, 544(7648), 80-83.
Mardirossian et al. (2014). ωB97X-V: A 10-parameter, range-separated hybrid, generalized gradient approximation density functional with nonlocal correlation, designed by a survival-of-the-fittest strategy. Physical Chemistry Chemical Physics, 16(21), 9904-9924.
Mellmann et al. (2016). Formic acid as a hydrogen storage material—development of homogeneous catalysts for selective hydrogen release. Chemical Society Reviews, 45(14), 3954-3988.
Mondal et al. (2015). Control in the rate-determining step provides a promising strategy to develop new catalysts for CO2 Hydrogenation: a local pair natural orbital coupled cluster theory study. Inorganic chemistry, 54(15), 7192-7198.
Morton et al (1988). Molecular hydrogen complexes in catalysis: highly efficient hydrogen production from alcoholic substrates catalysed by ruthenium complexes. Journal of the Chemical Society, Chemical Communications, (17), 1154-1156.
Nielsen et al. (2013). Low-temperature aqueous-phase methanol dehydrogenation to hydrogen and carbon dioxide. Nature, 495(7439), 85-89.
Oh et al. (2018). 2-(N-Methylbenzyl) pyridine: A Potential Liquid Organic Hydrogen Carrier with Fast H2 Release and Stable Activity in Consecutive Cycles. ChemSusChem, 11(4), 661-665.
Palo et al. (2007). Methanol steam reforming for hydrogen production. Chemical reviews, 107(10), 3992-4021.
Parrish et al. (2017). Psi4 1.1: An open-source electronic structure program emphasizing automation, advanced libraries, and interoperability. Journal of chemical theory and computation, 13(7), 3185-3197.
Patil et al. (2017). On H2 supply through liquid organic hydrides-Effect of functional groups. International Journal of Hydrogen Energy, 42(25), 16214-16224.
Preuster et al. (2017). Liquid organic hydrogen carriers (LOHCs): toward a hydrogen-free hydrogen economy. Accounts of chemical research, 50(1), 74-85.
Qian et al. (2010). Palladium-catalyzed benzylic addition of 2-methyl azaarenes to N-sulfonyl aldimines via C—H bond activation. Journal of the American Chemical Society, 132(11), 3650-3651.
Rodríguez-Lugo et al. (2013). A homogeneous transition metal complex for clean hydrogen production from methanol-water mixtures. Nature chemistry, 5(4), 342-347.
Sadaghiani et al. (2017). Introducing and energy analysis of a novel cryogenic hydrogen liquefaction process configuration. International journal of hydrogen energy, 42(9), 6033-6050.
Schildhauer et al. (2001). The equilibrium constant for the methylcyclohexane-toluene system. Journal of Catalysis, 198(2), 355-358.
Schlapbach et al. (2001). Hydrogen-storage materials for mobile applications: Materials for clean energy. Nature (London), 414(6861), 353-358.
Serp et al. (2009). Carbon materials for catalysis. Hoboken, NJ: John Wiley & Sons, pp. 5-23.
Singh et al. (2015). Hydrogen: A sustainable fuel for future of the transport sector. Renewable and Sustainable Energy Reviews, 51, 623-633.
Steele et al.(2001). "Materials for fuel-cell technologies: Materials for clean energy" Nature. 414(6861):345-52.
Taube et al. (1983). A system of hydrogen-powered vehicles with liquid organic hydrides. International Journal of Hydrogen Energy, 8(3), 213-225.
Trincado et al. (2017). Homogeneously catalysed conversion of aqueous formaldehyde to H 2 and carbonate. Nature communications, 8(1), 1-11.
Trincado et al. (2014). Molecular catalysts for hydrogen production from alcohols. Energy & Environmental Science, 7(8), 2464-2503.
Wang et al. (2014). The intensification technologies to water electrolysis for hydrogen production—a review. Renewable and Sustainable Energy Reviews, 29, 573-588.
Wang et al. (2013). One-pot conversion of cellulose to ethylene glycol with multifunctional tungsten-based catalysts. Accounts of chemical research, 46(7), 1377-1386.
Weigend et al. (2005). Balanced basis sets of split valence, triple zeta valence and quadruple zeta valence quality for H to Rn: Design and assessment of accuracy. Physical Chemistry Chemical Physics, 7(18), 3297-3305.
Weigend et al. (2006). Accurate Coulomb-fitting basis sets for H to Rn. *Physical chemistry chemical physics*, 8(9), 1057-1065.
Winsche et al. (1973). Hydrogen: its future role in the nation's energy economy. Science, 180(4093), 1325-1332.
Yadav et al. (2012). Liquid-phase chemical hydrogen storage materials. Energy & Environmental Science, 5(12), 9698-9725.
Yamaguchi et al. (2009). Homogeneous catalytic system for reversible dehydrogenation-hydrogenation reactions of nitrogen heterocycles with reversible interconversion of catalytic species. *Journal of the American Chemical Society,* 131(24), 8410-8412.
Yang et al (2018). Study of hydrogenation and dehydrogenation of 1-methylindole for reversible onboard hydrogen storage application. International Journal of Hydrogen Energy, 43(18), 8868-8876.
Ye et al. (2012). Electronic Structure Analysis of the Oxygen-Activation Mechanism by FeII-and α-Ketoglutarate (αKG)-Dependent Dioxygenases. Chemistry—A European Journal, 18(21), 6555-6567.
Yue et al. (2012). Ethylene glycol: properties, synthesis, and applications. Chemical Society Reviews, 41(11), 4218-4244.
Zhang et al. (2005). Facile conversion of alcohols into esters and dihydrogen catalyzed by new ruthenium complexes. Journal of the American Chemical Society, 127(31), 10840-10841.
Zhang et al. (2006). Efficient homogeneous catalytic hydrogenation of esters to alcohols. *Angewandte Chemie,* 118(7), 1131-1133.
Zhao et al. (2006). A new local density functional for main-group thermochemistry, transition metal bonding, thermochemical kinetics, and noncovalent interactions. *The Journal of chemical physics,* 125(19), 194101.

\* cited by examiner

| | | | | | |
|---|---|---|---|---|---|
| H₂-rich | piperidine | 2-methylpiperidine | 3-methylpiperidine | 4-methylpiperidine | 2,6-dimethylpiperidine |
| m.p.: | -7 °C | -5 °C | -27 °C | N.A. | -63 °C |
| b.p.: | 106 °C | 119 °C | 125 °C | 126 °C | 126-139 °C |
| H₂-lean | pyridine | 2-methylpyridine | 3-methylpyridine | 4-methylpyridine | 2,6-dimethylpyridine |
| m.p.: | -42 °C | -70 °C | -19 °C | 2.4 °C | -6 °C |
| b.p.: | 115 °C | 129 °C | 144 °C | 145 °C | 144 °C |
| HSC: | 7.1 wt% | 6.1 wt% | 6.1 wt% | 6.1 wt% | 5.3 wt% |

FIGURE 1E

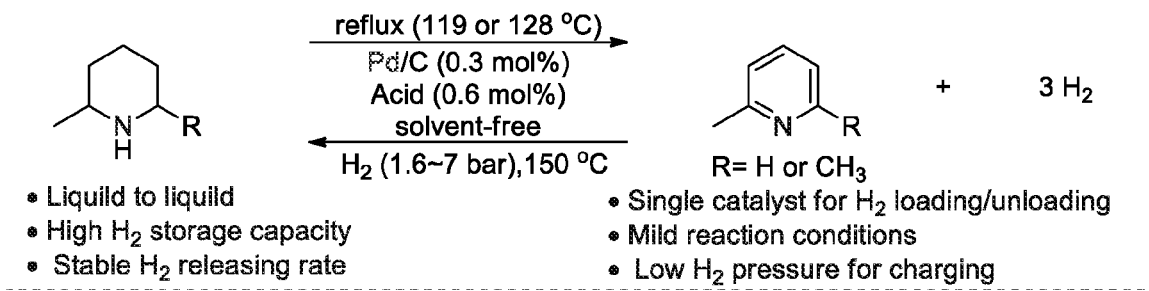

- Liquid to liquid
- High H₂ storage capacity
- Stable H₂ releasing rate
- Single catalyst for H₂ loading/unloading
- Mild reaction conditions
- Low H₂ pressure for charging

FIGURE 1F

| Entry | 1 (mmol) | T (°C) | t (h) | Conv. (%)[a] | 2 (%)[a] | $H_2$ (%)[b] |
|---|---|---|---|---|---|---|
| 1 | 10 | 170[c] | 51 | 100 | 87 | 90 |
| 2 | 10 | 150[c] | 117 | 98 | 86 | 84 |
| 3 | 20 | 170[c] | 94 | 98 | 81 | 91 |

[a] GC yield, based on the peak area. [b] Based on the collected $H_2$ amount. [c] Oil bath temperature (internal temperature is 119 °C). Higher bath temperature is more favorable for reflux.

| Entry | Pd(OAc)$_2$ (mmol) | C (mg) | ATOF$_{90}$ (mol H$_2$ per mol Pd per hour) |
|---|---|---|---|
| 1 | 0.02 | 50 | 48 |
| 2 | 0.02 | 40 | 70 |
| 3 | 0.02 | 20 | 62 |
| 4 | 0.03 | 40 | 91 | ns
REVERSIBLE LIQUID ORGANIC SYSTEM, METHOD AND PROCESS FOR LOADING AND DISCHARGING HYDROGEN BASED ON N-HETEROCYCLES

CROSS-REFERENCE TO RELATED APPLICATIONS

This application is a National Phase Application of PCT International Application No. PCT/IL2020/050153, International Filing Date Feb. 6, 2020, claiming priority from Israel serial No. 264702 patent application, filed Feb. 6, 2019, which are all hereby incorporated by reference.

FIELD OF THE INVENTION

The present invention provides a system, a process and a method of storing hydrogen ($H_2$) and releasing it on demand, comprising and making use of N-heterocycles as liquid organic hydrogen carriers (LOHCs).

BACKGROUND OF THE INVENTION

The process of industrialization has brought prosperity and wealth to large parts of humanity during the last centuries. However, one fundamental obstacle associated with these processes is the ever-increasing exhaustion of fossil resources, along with the generation of waste and emissions. This directly has an adverse environmental impact that might drastically threaten global living conditions in the future. The search for alternative and sustainable energy systems to replace the current fossil fuel-based technologies has thus become one of the central scientific challenges of our society. In this context, hydrogen has long been regarded as an ideal alternative clean energy vector, which possesses an extremely high gravimetric energy density (lower heating value: 33.3 kWh/kg) and produces water as the sole byproduct upon combustion. These intrinsic properties of hydrogen make it a particularly attractive candidate for both stationary and mobile applications.

Recently, significant advances have been made in hydrogen-powered fuel cells. Nonetheless, hydrogen as energy vector has not yet been universally applied, which might be due to problems related to its storage and transport. Efficient storage of hydrogen is both crucial and challenging, due to its low volumetric energy density. Traditionally, hydrogen is stored physically in gas tanks under high pressure or as a liquid at cryogenic temperatures. However, the high energy input needed for storage, the low volumetric energy density, and potential safety issues largely limit applications using molecular hydrogen. Although extensive efforts have been made to store hydrogen in nanostructured materials, metal organic frameworks and metal hydrides, these systems suffer from low hydrogen storage capacities (HSC), harsh conditions, low energy efficiency, and high cost.

In recent years, storing hydrogen in chemical bonds has gained much attention, and is regarded as a promising pathway for a future "hydrogen economy". Several kinds of metal hydrides, metal complexes and organic compounds have been investigated in this regard. Particularly interesting are liquid organic compounds as hydrogen carriers, which can have high hydrogen capacities, close to the U.S. Department of Energy (DOE of US, 5.5 wt % hydrogen storage capacity) and European Union (EU, 5 wt % hydrogen storage capacity) target for 2020. Moreover, liquid organic hydrogen carriers (LOHC) can have good stability, can be stored for a long time and readily transported, and may have potential applicability for on-board usage in vehicles.

A LOHC system is based on catalytic dehydrogenation of a hydrogen rich organic liquid, forming a $H_2$-lean compound, which upon catalytic hydrogenation can regenerate the $H_2$-rich compound. In early studies, aromatic hydrocarbons and their hydrogenated products were investigated as couples of $H_2$-lean and $H_2$-rich compounds. These LOHC systems can have a wide liquid range, excellent thermal stabilities, at low price. However, the dehydrogenation of $H_2$-rich hydrocarbons for producing $H_2$ and corresponding $H_2$-deficient aromatic hydrocarbons are thermodynamically unfavorable, which require harsh reaction conditions (temperatures above 250° C.).

The presence of nitrogen atom in LOHC systems based on N-heterocycles can reduce the enthalpy in hydrogenation and dehydrogenation, hence several N-heterocyclic LOHC systems have been investigated. One of the most attractive examples is the N-ethylcarbazole (NEC)/dodecahydro-N-ethylcarbazole ($H_{12}$—NEC) system, which has 5.80 wt % theoretical hydrogen storage capacity (HSC), developed by Pez and his co-workers (FIG. 1A). However, NEC/$H_{12}$-NEC system also has significant drawbacks: the reverse hydrogenation needs a different catalyst Ru/LiAlO$_2$ and high $H_2$ pressure (68 bar); the $H_2$-lean compound N-ethylcarbazole is solid at room temperature (melting points 70° C.); and the thermal lability of the N-ethyl group leads to undesired side products.

In 2017, Fujita and his co-workers reported an interesting homogeneous Ir-complex catalyzed LOHC system based on 2,5-dimethylpyrazine/2,5-dimethylpiperazine in p-xylene/$H_2O$ or solvent-free, which has 5.3 wt % theoretical hydrogen storage capacity (FIG. 1B). However, under solvent-free conditions, the hydrogenation of 2,5-dimethylpyrazine to 2,5-dimethylpiperazine could not be completely achieved (78% conversion) under 30 bar of $H_2$. Moreover, the high melting point of 2,5-dimethylpiperazine is also a disadvantage. Some recently reported N-based heteroaromatic/heteroalicyclic LOHC systems are 2,6-dimethyl-1,5-naphthyridine/2,6-dimethyldecahydro-1,5-naphthyridine (Fujita et. al. *J. Am. Chem. Soc.* 2014, 136, 4829-4832), phenazine/tetradecahydrophenazine (Forberg et. al. *Nat. Commun.* 2016, 7, 13201), 4-aminopiperidine/4-aminopyridine (Cui et. al. *New J. Chem.*, 2008, 32, 1027-1037), 2,6-di-tert-butylpiperidine/2,6-di-tert-butylpyridine (Dean et. al. *New J. Chem.*, 2011, 35, 417-422) and 2-(N-methylbenzyl)pyridine/2-[(n-methylcyclohexyl)methyl]piperidine (Oh et. al. *Chem Sus Chem* 2018, 11, 661-665). However, almost all of them suffer from high melting points. Besides, the 2,6-dimethyl-1,5-naphthyridine/2,6-dimethyldecahydro-1,5-naphthyridine and phenazine/tetradecahydrophenazine systems use an expensive catalyst and solvent; the 4-aminopiperidine/4-aminopyridine system has problems in balancing the conversion and selectivity; the 6-di-tert-butylpiperidine/2,6-di-tert-butylpyridine system has low hydrogen storage capacity; 2-[(n-methylcyclohexyl)methyl]piperidine/2-(N-methylbenzyl)pyridine has low melting points, but requires high temperature (>230° C.) for dehydrogenation.

In 2015, a new LOHC, based on the dehydrogenative amide bond formation, which is thermodynamically favorable, was developed, but solvent was required (Hu et. al. *Nat. Commun.* 2015, 6, 6859). Developing a LOHC system based on inexpensive organic liquid (which has a wide liquid range, low melting point) with high hydrogen storage capacity, solvent-free, under mild conditions, ideally using a single catalyst catalyzed for both hydrogenation and dehydrogenation is of great importance and challenge.

Piperidines were considered as potential ideal candidates of LOHCs, because they are abundant and inexpensive, have low melting points, wide liquid ranges, high theoretical hydrogen storage capacities (exceeding the targets of the US DOE and European Union), as shown in FIG. 1C. The acceptorless dehydrogenation of piperidines so far requires harsh conditions, as listed in Table 1.

TABLE 1

Acceptorless dehydrogenation of piperidines to pyridines.

| Entry | Substrate | Conditions |
|---|---|---|
| 1 | piperidine | Pd/SiO$_2$, 350° C., H$_2$ flow. |
| 2 | 2-methylpiperidine | — |
| 3 | 3-methylpiperidine | Pt/SiO$_2$ or Pd/SiO$_2$, at 330° C., under H$_2$ flow; or at 300° C., under H$_2$/N$_2$ = 1:1 flow. |
| 4 | 4-methylpiperidine | Pt/ACC, 350° C., H$_2$/N$_2$ = 1:1 flow. |
| 5 | 2,6-dimethylpiperidine | [Fe] (58% yield), [Ir] (88% yield) or [Os] (29% yield) complexes, in xylene, reflux. |

The catalytic dehydrogenation of piperidine (Horrobin et. al. U.S. Pat. No. 2,765,311A, 1956), 3-methylpiperidine (Cordier et. al. U.S. Pat. No. 4,401,819, 1983; Pianzola et. al. US0092711A1, 2011) and 4-methylpiperidine (Patil et. al. *Int. J. Hydrogen Energy.* 2017, 42, 16214-16224) to pyridine, 3-methylpyridine and 4-methylpyridine respectively, requires more than 300° C., using a heterogeneous Pd or Pt catalyst (Table 1, entries 1, 3 and 4). Acceptorless dehydrogenation of 2-methylpiperidine to 2-picoline has not been reported (Table 1, entry 2). The catalytic dehydrogenation of 2,6-dimethylpiperidine to 2,6-lutidine has only been achieved in a solvent by homogeneous Fe (Chakraborty et. al. *J. Am. Chem. Soc.* 2014, 136, 8564-8567), Ir (Fujita et. al. *Angew. Chem. Int. Ed.* 2017, 56, 10886-10889), or Os (Esteruelas et. al. *Organometallics* 2017, 36, 2996-3004) catalysts (entry 5), and a solvent-free system has not been reported yet. Obviously, using solvent lowers the theoretical hydrogen storage capacity.

Clearly, the development of inexpensive and abundant organic compounds with potentially high capacity to store and release hydrogen, ideally using the same catalyst for both loading and discharging hydrogen under relatively mild conditions, is a major challenge with no acceptable solutions known at this time. Therefore, developing a suitable catalytic system for mild, solvent-free, reversible dehydrogenation/hydrogenation of piperidines/pyridines is not only of theoretically significant, but also of practical interest, and a LOHC systems based on piperidines, using a single heterogeneous catalyst for both dehydrogenation and hydrogenation under mild conditions, with high hydrogen storage capacities, is highly desirable.

SUMMARY OF THE INVENTION

Thus, in the first aspect of the present invention, this invention provides a reversible hydrogen loading and discharging system comprising: at least one N-heterocycle; and one transition metal catalyst, or transition metal catalyst precursor, wherein the system does not comprise any solvent and is functional under mild temperatures and pressures. In some embodiments, the temperatures are between 50° C. and 180° C., the pressures are between 1 and 80 bar, or combination thereof. In some embodiments, the temperatures are between 130° C. and 180° C., the pressures are between 1.5 and 8 bar, or combination thereof. In some embodiments, the N-heterocylce is a H$_2$-rich compound, an H$_2$-lean compound or a combination thereof, and wherein the H$_2$-rich compound is a substituted or unsubstituted piperidine, and the H$_2$-lean compound is a substituted or unsubstituted pyridine. In some embodiment, the H$_2$-rich compound is a substituted piperidine, and the H$_2$-lean compound is a substituted pyridine. In some embodiments, the N-heterocycle is a liquid at least between a temperature of 15° C. and 100° C. In some embodiments, both the substituted or unsubstituted piperidine and the substituted or unsubstituted pyridine are liquids at room temperature. In some embodiments, the substituted piperidine is 2,6-dimethylpiperidine or 2-methylpiperidine. In some embodiments, the transition metal catalyst is palladium on activated carbon (Pd/C).

In some embodiments, the catalyst is commercially available or is generated in-situ from a catalyst precursor. In some embodiments, the catalyst precursor is Pd(OAc)$_2$. In some embodiments, the same catalyst is used both for hydrogen loading (hydrogenation) and hydrogen discharging (dehydrogenation) processes. In some embodiments, the system further comprises a catalytic amount of at least one acid. In some embodiments, the acid is selected from: acetic acid, benzoic acid, carboxypolystyrene and polyacrylic acid. In some embodiments, the catalyst or the catalyst precursor is present in an amount of between 0.05% to 5% w/w.

In the second aspect of the present invention, this invention provides a reversible process for the storage and release of hydrogen (H$_2$) upon demand comprising the steps of:
a. when hydrogen storage is desired, reacting a substituted or unsubstituted pyridine with molecular hydrogen (H$_2$) in the presence of a first catalyst, under conditions sufficient to generate a substituted or unsubstituted piperidine derivative; and
b. when hydrogen release is desired, reacting a substituted or unsubstituted piperidine with a second catalyst, under conditions sufficient to release hydrogen, thereby generating the corresponding substituted or unsubstituted pyridine derivative and molecular hydrogen (H$_2$);
wherein the first and the second catalyst are the same, the process does not comprise any solvent, and the process is carried out under mild temperatures and hydrogen pressures. In some embodiments, both the substituted/unsubstituted piperidine and the substituted/unsubstituted pyridine are liquids at room temperature. In some embodiments, the substituted piperidine is selected from: piperidine, 2-methylpiperidine, 3-methylpiperidine, 4-methylpiperidine, 3,4-dimethylpiperidine 2,4-dimethylpiperidine, 2,5-dimethylpiperidine and 2,6-dimethylpiperidine. In some embodiments, the catalyst is palladium on activated carbon (Pd/C). In some embodiments, the catalyst is commercially available or is generated in-situ from a catalyst precursor. In some embodiments, the catalyst precursor is $Pd(OAc)_2$. In some embodiments, the process further comprises at least one acid. In some embodiments, the acid is selected from: acetic acid, benzoic acid, carboxypolystyrene and polyacrylic acid. In some embodiments, the catalyst precursor is present in an amount of between 0.05% to 5% w/w.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1F depict hydrogen storage systems based on nitrogen-containing organic compounds. FIG. 1A: Well-established liquid organic hydrogen carrier based on N-ethylcarbazole/dodecahydro-N-ethylcarbazole (Pez et al.). FIG. 1B: Homogeneous Ir-complex catalyzed LOHC system based on 2,5-dimethylpyrazine/2,5-dimethylpiperazine in p-xylene/$H_2O$ or solvent-free (Fujita et al.). FIGS. 1C-1D: Examples of liquid organic hydrogen carriers. FIG. 1E: Examples of pyridines/piperidines compounds suitable for hydrogen storage of this invention. FIG. 1F: Solvent-free LOHC system according to this invention.

FIG. 2A: Conditions and results of 2-methylpiperidine dehydrogenation. FIG. 2B: time-dependent $H_2$ release curves under different conditions.

FIG. 5A: suggested side reactions and byproducts. FIG. 5B: suggested strategies for controlling the selectivity of the processes, by increasing steric hindrance around the imine or enamine.

FIG. 6A: time-dependent $H_2$ release curves at 170° C. (bath tempersure, internal temperature is 128° C.). FIG. 6B: Conversions of dehydrogenation (light grey) and hydrogenation (dark grey).

FIG. 7A: Dehydrogenation with $Pd(OAc)_2$ and activated carbon (heterogeneous) FIG. 7B: filtration of the solids to check homogeneous catalysis.

Figure 1A:
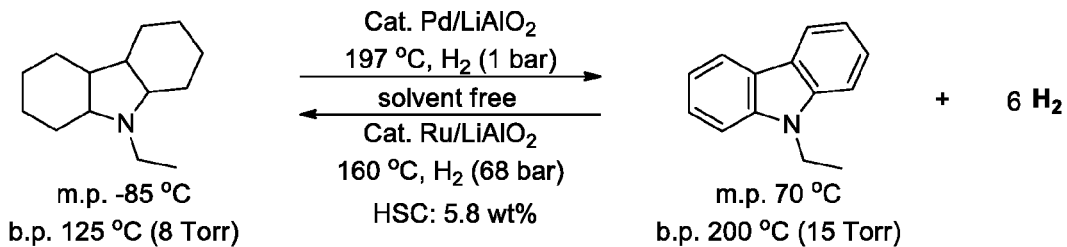
Figure 1B:
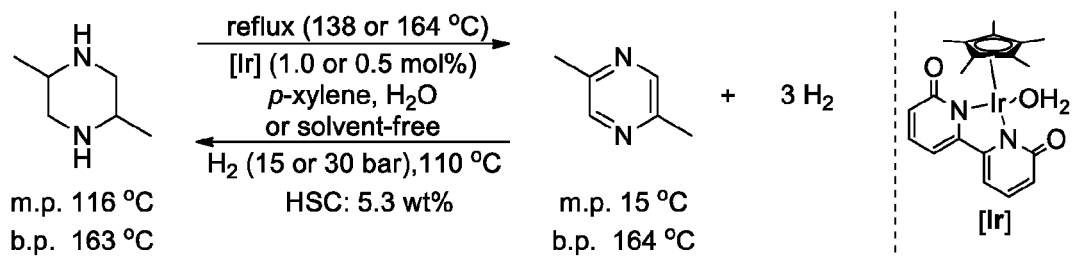
Figure 1C:
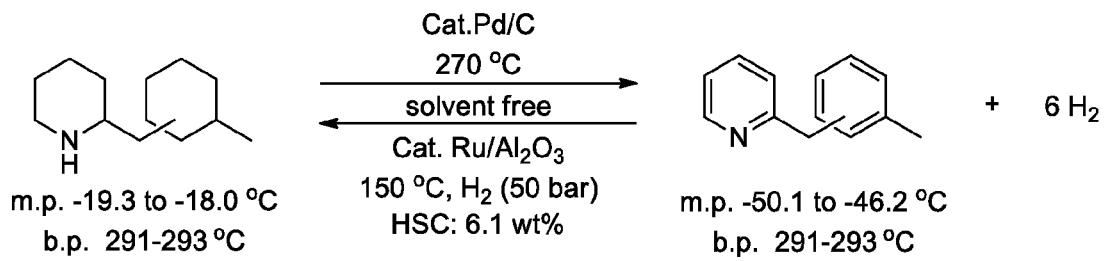

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

As contemplated herein, a fundamentally new, reversible system that can load and unload $H_2$ with a potentially high hydrogen storage capacity has been developed.

Accordingly, the present invention provides a method, a process and system for storing hydrogen ($H_2$) and releasing it on demand, based on the reaction of hydrogen rich N-heterocycles with at least one transition metal catalyst to form the corresponding hydrogen lean N-heterocycle and at least one, at least two, or at least three hydrogen molecules (for each molecule of the hydrogen rich N-heterocycle); each represents a separate embodiment according to this invention. In some embodiments, the catalyst is a palladium on activated carbon (Pd/C). In other embodiment, the catalyst (for hydrogenation and dehydrogenation) is Pd/C, $Pd(OAc)_2$/activated carbon. In some embodiment the catalyst for hydrogenation is $Ru/Al_2O_3$. In some embodiments, the system does not comprise any solvent. In some embodiments, the hydrogen storage/loading is carried out in mild temperature (e.g., between 50-200° C.). In some embodiments, the hydrogen storage/loading is carried out under mild hydrogen pressure (e.g., between 1.5 and 8 bar). In some embodiments, the hydrogen release/unloading is carried out under mild pressure (e.g., atmospheric pressure). In some embodiments, the hydrogen release/unloading is carried out in mild temperatures (e.g. between 100-200° C.). In other embodiments, the same catalyst is reused (as is) in a reversible process for the storage and release of hydrogen ($H_2$). In other embodiments, the same catalyst is recycled and used in the storage and/or release process of hydrogen ($H_2$).

Upon loading of hydrogen molecules, the hydrogen lean N-heterocycle is reacted with at least one hydrogen molecule to form hydrogen rich N-heterocycle. Preferably, the hydrogen lean N-heterocycle is a substituted or unsubstituted pyridine and the hydrogen rich N-heterocycle is a substituted or unsubstituted piperidine. In another embodiment, the hydrogen lean N-heterocycle is a substituted pyridine and the hydrogen rich N-heterocycle is a substituted piperidine.

Accordingly, the present invention further provides a method, a process and a system for storing hydrogen ($H_2$) and releasing it on demand, based on the hydrogenation of substituted/unsubstituted pyridines and the dehydrogenation of the corresponding substituted/unsubstituted piperidines liquid-organic hydrogen carriers (LOHCs). More specifically, the invention relates to substituted/unsubstituted piperidine LOHC. The process for hydrogen storage of this invention has a potential high hydrogen storage capacity.

FIGS. 1A-1F presents examples of some of the processes and methods for releasing and loading hydrogen molecules in N-heterocylces. FIG. 1F presents examples of the processes and methods described herein.

$H_2$-rich N-heterocycles (e.g., substituted/unsubstituted piperidines) undergo catalytic dehydrogenation to form the corresponding $H_2$-lean N-heterocycles (e.g., substituted/unsubstituted pyridines) with release of hydrogen. The $H_2$-lean N-heterocycles (e.g., substituted/unsubstituted pyridines) may be hydrogenated back to the corresponding $H_2$-rich N-heterocycles (e.g., substituted/unsubstituted piperidines), which function as a hydrogen storage system. These reactions may be catalyzed by a variety of catalytic systems, including transition metals, transition metal-based compounds and complexes, heterogeneous and homogeneous catalysts, with or without polymer and/or insoluble matrices support. Examples of suitable catalysts are Palladium (Pd), Platinum (Pt), Ruthenium (Ru), Copper (Cu), Iron (Fe), and compounds and complexes containing these metals, among others, preferably Palladium (Pd), Platinum (Pt), and Ruthenium (Ru) and compounds and complexes containing these metals. Preferably, the catalyst is heterogeneous catalyst such as Pd/C, Pd(OAc)$_2$/activated carbon, Ru/Al$_2$O$_3$. In some embodiments, the catalyst is formed in situ by using a catalyst precursor instead, which may be either soluble (homogeneous) or insoluble (heterogeneous) in the reaction mixture of said system, process or method. In some embodiments, the catalyst precursor becomes an active catalyst upon entering the reaction mixture, and/or interaction with the N-heterocycle substrate (either $H_2$-rich or $H_2$-lean substrate) or $H_2$. In some embodiments, the catalyst precursor is Pd(OAc)$_2$.

In one embodiment, "transition metal catalyst precursor" refers to a transition metal compound that can transform to an active catalyst useful for the purpose of this invention in situ. Examples of transition metal catalyst precursors include but not limited to: Pd(OAc)$_2$, PdCl$_2$, Pd(TFA)$_2$, Pd(acac)$_2$, and Pd$_2$(dba)$_3$ Pt(OAc)$_2$, Pt(TFA)$_2$, Pt(acac)$_2$, PtCl$_2$, PtO$_2$, Ru(OAc)$_2$, RuCl$_3$. In some embodiments, upon entering the reaction mixture, which comprises the N-heterocycle and a solid support (e.g., activated carbon), the Pd(OAc)$_2$ catalyst precursor transforms in situ to palladium supported on the solid support (e.g., Pd/C). In other embodiments, the Pd(OAc)$_2$ catalyst precursor transforms in situ to palladium supported on the solid support (e.g., Pd/C) when the reaction mixture is heated to a temperature of about 100-200 C.

In other embodiments, the same catalyst is reused (as is) in a reversible process for the storage and release of hydrogen ($H_2$). In other embodiments, the same catalyst is recycled and used in the storage and/or release process of hydrogen ($H_2$).

In one embodiment, a catalyst being "reused (as is) in a reversible process for the storage and release of hydrogen ($H_2$)", refers to a process or system, where the storage and release of hydrogen occurs upon demand, and the same catalyst is used in both storage and release step without any further treatment.

In one embodiment, a catalyst being "recycled and used in the storage and/or release process of hydrogen ($H_2$)", refers to a process or system, where the storage and release of hydrogen occurs upon demand, and the catalyst is recycled (i.e. the catalyst is being isolated by for example centrifugation or filtration under inert atmosphere) and used again upon demand.

Thus, in some embodiments, the present invention relates to the use of an $H_2$-rich substituted N-heterocycle, e.g., 2-methylpiperidine and/or 2,6-dimethylpiperidine, as a liquid organic hydrogen carrier (LOHC) to store hydrogen ($H_2$) and release it on demand.

In another embodiment, the present invention relates to a process for the release hydrogen ($H_2$), the process comprises the step of reacting a substituted/unsubstituted piperidine derivative (e.g., 2-methylpiperidine or 2,6-dimethylpiperidine) with a catalyst (e.g., Pd/C, Pd(OAc)$_2$/activated carbon), under conditions sufficient to release hydrogen, thereby generating the corresponding substituted/unsubstituted pyridine derivative (e.g., 2-methylpyridine (2-picoline) or 2,6-dimethylpyridine (2,6-lutidine)) and molecular hydrogen ($H_2$). In some embodiments, the process is carried out with a catalytic amount of an acid. In some embodiments, the process is carried out under mild temperatures (e.g., between 100-200° C.). In some embodiments, the process is carried out under mild pressure (e.g., atmospheric pressure). In some embodiments, the process does not comprise any solvent.

In the context of this invention, the terms "release", "discharging" and "unloading" are used interchangeably and correspond to the generation of hydrogen molecules from hydrogen rich organic compounds, by a catalytic dehydrogenation process of the compounds.

In another embodiment, the present invention relates to a process for the storage of hydrogen, the process comprises the step of reacting a substituted/unsubstituted pyridine derivative (e.g., 2-methylpyridine (2-picoline) or 2,6-dimethylpyridine (2,6-lutidine)) with molecular hydrogen ($H_2$) in the presence of a catalyst (e.g., Pd/C, Pd(OAc)$_2$/activated carbon, Ru/Al$_2$O$_3$), under conditions sufficient to generate a substituted/unsubstituted piperidine derivative (e.g., 2-methylpiperidine or 2,6-dimethylpiperidine) as a hydrogen storage system. In some embodiments, the process is carried out with a catalytic amount of an acid. In some embodiments, the process is carried out under mild temperatures (e.g., between 100-200° C.). In some embodiments, the process is carried out under mild hydrogen pressure (e.g., between 1.5 and 8 bar). In some embodiments, the process does not contain any solvent.

In the context of this invention, the terms "storage", "charging" and "loading" are used interchangeably and correspond to the incorporation of hydrogen molecules into hydrogen lean organic compounds, by a catalytic hydrogenation process of the compounds.

In another embodiment, the present invention relates to a process for the storage and release of hydrogen ($H_2$) upon demand, comprising the steps of: (a) when hydrogen storage is desired, reacting a substituted/unsubstituted pyridine derivative (e.g., 2-methylpyridine (2-picoline) or 2,6-dimethylpyridine (2,6-lutidine)) with molecular hydrogen ($H_2$) in the presence of a first catalyst (e.g., Pd/C, Pd(OAc)$_2$/activated carbon, Ru/Al$_2$O$_3$), under conditions sufficient to generate a substituted/unsubstituted piperidine derivative (e.g., 2-methylpiperidine or 2,6-dimethylpiperidine); and (b) when hydrogen release is desired, reacting a substituted/unsubstituted piperidine derivative (e.g., 2-methylpiperidine or 2,6-dimethylpiperidine) with a second catalyst (e.g., Pd/C, Pd(OAc)$_2$/activated carbon), under conditions sufficient to release hydrogen, thereby generating the corresponding substituted/unsubstituted pyridine derivative (e.g., 2-methylpyridine (2-picoline) or 2,6-dimethylpyridine (2,6-lutidine)) and molecular hydrogen ($H_2$). The first and second catalyst may be the same or different. In a preferred embodiment, the first and second catalysts are the same. In other embodiments, the same catalyst is reused (as is) in a reversible process for the storage and release of hydrogen ($H_2$). In other embodiments, the same catalyst is recycled and used in the storage and/or release process of hydrogen ($H_2$).

In some embodiments, the process is carried out with a catalytic amount of an acid. In some embodiments, the process is carried out under mild temperatures (e.g., between 100-200° C., 130-180° C., 150-170° C.). In some embodiments, the process for storing hydrogen is carried out under mild hydrogen pressure (e.g., between 1.5 and 8 bar). In some embodiments, the process for releasing hydrogen is carried out under mild pressure (e.g., atmospheric pressure). In some embodiments, the process does not comprise any solvent.

This invention provides a reversible hydrogen loading and discharging system comprising: at least one N-heterocycle; and at least one transition metal catalyst, or transition metal catalyst precursor.

This invention provides a reversible hydrogen loading and discharging system comprising: at least one N-heterocycle; and one transition metal catalyst, or transition metal catalyst precursor.

The invention further provides a reversible hydrogen loading and discharging method, comprising the steps of:
(a) hydrogen releasing process: contacting at least one substituted N-heterocycle $H_2$-rich compound with at least one transition metal catalyst under conditions that allow dehydrogenation of the substituted N-heterocycle $H_2$-rich compound, thereby forming three hydrogen molecules and at least one substituted N-heterocycle $H_2$-lean compound;
(b) hydrogen loading process: contacting said at least one substituted N-heterocycle $H_2$-lean compound with said at least one transition metal catalyst and three hydrogen molecules under conditions for hydrogenation of said substituted N-heterocycle $H_2$-lean compound, thereby forming at least one substituted N-heterocycle $H_2$-rich compound.

The invention further provides a reversible hydrogen loading and discharging method, comprising the steps of:
(c) hydrogen releasing process: contacting at least one substituted/unsubstituted piperidine with at least one transition metal catalyst under conditions that allow dehydrogenation of the substituted/unsubstituted piperidine, thereby forming three hydrogen molecules and at least one substituted pyridine;
(d) hydrogen loading process: contacting said at least one substituted/unsubstituted pyridine with said at least one transition metal catalyst and three hydrogen molecules under conditions for hydrogenation of said substituted/unsubstituted pyridine, thereby forming at least one substituted piperidine.

In some embodiments, the N-heterocycle in the system, process and/or method according to this invention, is an $H_2$-rich compound. In other embodiments, the $H_2$-rich compound is a substituted/unsubstituted piperidine. In other embodiments, the $H_2$-rich compound is a substituted piperidine. In other embodiments, the N-heterocycle is an $H_2$-lean compound. In other embodiments, the $H_2$-lean compound is a substituted/unsubstituted pyridine. In other embodiments, the $H_2$-lean compound is a substituted pyridine. In other embodiments, the N-heterocycle is a combination of an $H_2$-rich compound and an $H_2$-lean compound. In other embodiments, the N-heterocycle is a combination of a substituted/unsubstituted pyridine and substituted/unsubstituted piperidine.

In some embodiments, the term "substituted piperidine" and/or "substituted pyridine" refers to piperidine or pyridine derivatives, which have ring substitutions including, but not limited to at least one selected from: $C_1$-$C_3$ alkyls (e.g., methyl, ethyl, propyl), $C_1$ haloalkyls (e.g., $CF_3$, $CHF_2$, $CH_2F$), $C_1$-$C_2$ alkoxyls ($OCH_3$, $OCH_2CH_3$), F, Cl, OH, $NH_2$, $N(CH_3)_2$, CN, aryl, phenyl. In other embodiments, the substitutions are at least one selected from: $CH_3$, OH, $OCH_3$, $NH_2$. In other embodiments, substitutions are at least one $CH_3$. In other embodiments, substitutions are two $CH_3$ groups.

In some embodiments, the N-heterocycle $H_2$-rich compound is selected from: piperidine, 2-methylpiperidine, 3-methylpiperidine, 4-methylpiperidine, 2,6-dimethylpiperidine, 2,4-dimethylpiperidine, 2,3-dimethylpiperidine, 2,5-dimethylpiperidine, 3,4-dimethylpiperidine, 3,5-dimethylpiperidine, 2,5-dimethylpiperidine, 2,4,6-trimethylpiperidine or any combination thereof; each represents a separate embodiment according to this invention. In some embodiments, the N-heterocycle $H_2$-rich compound is piperidine. In some embodiments, the N-heterocycle $H_2$-rich compound is 2-methylpiperidine. In some embodiments, the N-heterocycle $H_2$-rich compound is 2,6-dimethylpiperidine. In some embodiments, the N-heterocycle $H_2$-rich compound is piperidine. In some embodiments, the N-heterocycle $H_2$-rich compound is 3-methylpiperidine. In some embodiments, the N-heterocycle $H_2$-rich compound is 4-methylpiperidine. In some embodiments, the N-heterocycle $H_2$-rich compound is 2,4-dimethylpiperidine. In some embodiments, the N-heterocycle $H_2$-rich compound is 2,3-dimethylpiperidine. In some embodiments, the N-heterocycle $H_2$-rich compound is 2,5-dimethylpiperidine. In some embodiments, the N-heterocycle $H_2$-rich compound is 3,4-dimethylpiperidine. In some embodiments, the N-heterocycle $H_2$-rich compound is 3,5-dimethylpiperidine. In some embodiments, the N-heterocycle $H_2$-rich compound is 2,5-dimethylpiperidine. In some embodiments, the N-heterocycle $H_2$-rich compound is 2,4,6-trimethylpiperidine.

In some embodiments, the N-heterocycle $H_2$-lean compound is selected from: pyridine, 2-methylpyridine (2-picoline), 3-methylpyridine, 4-methylpyridine, 2,6-dimethylpyridine (2,6-lutidine), 2,4-dimethylpyridine, 2,3-dimethylpyridine, 2,5-dimethylpyridine, 3,4-dimethylpyridine, 3,5-dimethylpyridine, 2,5-dimethylpyridine, 2,4,6-trimethylpyridine or any combination thereof; each represents a separate embodiment according to this invention. In some embodiments, the N-heterocycle $H_2$-lean compound is pyridine. In some embodiments, the N-heterocycle $H_2$-lean compound is 2-methylpyridine (2-picoline). In some embodiments, the N-heterocycle $H_2$-lean compound is 2,6-dimethylpyridine (2,6-lutidine). In some embodiments, the N-heterocycle $H_2$-lean compound is pyridine. In some embodiments, the N-heterocycle $H_2$-lean compound is 3-methylpyridine. In some embodiments, the N-heterocycle $H_2$-lean compound is 4-methylpyridine. In some embodiments, the N-heterocycle $H_2$-lean compound is 2,4-dimethylpyridine. In some embodiments, the N-heterocycle $H_2$-lean compound is 2,3-dimethylpyridine. In some embodiments, the N-heterocycle $H_2$-lean compound is 2,5-dimethylpyridine. In some embodiments, the N-heterocycle $H_2$-lean compound is 3,4-dimethylpyridine. In some embodiments, the N-heterocycle $H_2$-lean compound is 3,5-dimethylpypridine. In some embodiments, the N-heterocycle $H_2$-lean compound is 2,5-dimethylpyridine, 2,4,6-trimethylpyridine.

In some embodiments, the N-heterocycle has a wide liquid range.

According to this invention, "liquid range" of a substance refers to a possible range of temperature where liquid is allowed to exist. The value of its liquid range is obtained by subtracting melting point from its boiling point. If the boiling point is higher than its melting point, the liquid range is said to be positive; if the boiling point is lower than its melting point, the liquid range is negative, meaning that liquid is not possible to form unless pressure applied on the substance is raised. In some embodiments according to this invention, "wide liquid range" refers to a temperature range of at least 80 degrees between the melting point and the boiling point of a substance. In other embodiments, at least 90, 100, 110, 120, 130, 140, 150, 160, 170, 180, 190, 200, 220, 250, 300 degrees between the melting point and the boiling point of a substance; each represents a separate embodiment according to this invention.

In some embodiments, the N-heterocycle has a melting point of below −10° C., below −5° C., below 0° C., below 5° C., below 10° C., below 15° C., below 20° C., below 25° C., below 30° C., below 35° C., below 40° C., below 45° C., below 50° C., below 55° C.; each represent a separate embodiment according to this invention.

In some embodiments, the N-heterocycle has a boiling point of above 50° C., above 70° C., above 90° C., above 100° C., above 120° C., above 130° C., above 150° C., above 170° C., above 200° C., above 230° C., above 250° C., above 300° C.; each represent a separate embodiment according to this invention.

In some embodiments, the N-heterocycle is a liquid at least between a temperature of 15° C. and 200° C.; between 0° C. and 250° C.; between 10° C. and 180° C.; between 25° C. and 250° C.; between 0° C. and 300° C.; between 5° C. and 200° C.; between 5° C. and 250° C.; between 15° C. and 150° C.; between 5° C. and 150° C.; between 5° C. and 170° C.; between −10° C. and 250° C.; each represent a separate embodiment according to this invention.

In some embodiments, both the $H_2$-lean N-heterocycle and the $H_2$-rich N-heterocycle are liquids at room temperature. In some embodiments, both the substituted/unsubstituted pyridine and the substituted/unsubstituted piperidine are liquids at room temperature.

In some embodiments, the system, process or method according to this invention is functioning under a temperature range of between about 130° C. and about 180° C., between about 50° C. and about 180° C., between about 100° C. and about 180° C., between about 100° C. and about 250° C., between about 140° C. and about 180° C., between about 100° C. and about 200° C., between about 130° C. and about 220° C., between about 150° C. and about 170° C., between about 130° C. and about 200° C.; each is a separate embodiment according to this invention. In some embodiments, the system, process or method according to this invention is functioning under a temperature of 170° C., 150° C., 119° C., 117° C., or 130° C.; each is a separate embodiment according to this invention.

In some embodiments, the hydrogenation process that is carried out in the system, process or method according to this invention, takes place under low pressure of hydrogen. In some embodiments, the hydrogenation process that is carried out in the system, process or method according to this invention, takes place under a hydrogen pressure of between about 1 bar and about 80 bar, between about 15 bar and about 60 bar, between about 1.5 bar and about 59 bar, between about 1 bar and about 59 bar, between about 4 bar and about 50 bar, between about 1.3 bar and about 50 bar, between about 1.5 bar and about 20 bar, between about 1.5 bar and about 10 bar, between about 1.5 bar and about 8 bar, between about 1.2 bar and about 6 bar, between about 1 bar and about 8 bar, between about 1.6 bar and about 5 bar, between about 2.6 bar and about 5 bar, between about 1.2 and about 8 bar, between about 30 bar and about 50 bar, between about 3.5 bar and about 5 bar, between about 2.5 bar and about 5 bar, between about 1.5 bar and about 5 bar, between about 1.5 and about 7 bar; each represent a separate embodiment according to this invention. In some embodiments, the hydrogenation process that is carried out in the system, process or method according to this invention, takes place under a hydrogen pressure of 1.0, 1.1, 1.2, 1.3, 1.4, 1.5, 1.6, 1.7, 1.8, 1.9, 2.0, 2.5, 3.0, 3.5, 4.0, 4.5, 5.0, 5.5, 6.0, 6.5, 7.0, 7.5, or 8.0 bar; each represent a separate embodiment according to this invention.

In some embodiments the transition metal catalyst is the same in the hydrogen releasing and hydrogen loading reactions in a system, process or method of the invention. In some embodiments, the same catalyst is used for both hydrogen loading (hydrogenation) and hydrogen discharging (dehydrogenation) processes.

In other embodiments, the same catalyst is reused (as is) in a reversible process for the storage and release of hydrogen ($H_2$). In other embodiments, the same catalyst is recycled and used in the storage and/or release process of hydrogen ($H_2$).

In some embodiments the transition metal is selected from Mn, Fe, Co, Ni, Ru, Rh, Pd, Pt, Cu, Ag. In some embodiments the transition metal is selected from Ru, Pd, and Pt. In some embodiments the transition metal catalyst is heterogeneous. In some embodiments the transition metal catalyst is homogeneous. In some embodiments, the transition metal catalyst is palladium on activated carbon (Pd/C). In some embodiments, the transition metal catalyst is Pd$(OAc)_2$. In some embodiments, the transition metal catalyst is Ru/$Al_2O_3$. In some embodiments, the catalyst is commercially available. Examples of commercially available catalysts include but not limited to: 5 wt % Pt/C, 10 wt % Pt/C, 1 wt % Pt/C, 3 wt % Pt/C, 30 wt % Pt/C, 0.5 wt % Pt/$Al_2O_3$, 1 wt % Pt/$Al_2O_3$, 4 wt % Pd/MCM-48, 5 wt % Pd/$SiO_2$, 0.5 wt % Pd/$Al_2O_3$, 1 wt % Pd/$Al_2O_3$, 5 wt % Pd/$Al_2O_3$, 10 wt % Pd/$Al_2O_3$, 0.6 wt % Pd/C, 1 wt % Pd/C, 3 wt % Pd/C, 5 wt % Pd/C, 10 wt % Pd/C, 20 wt % Pd/C, 30 wt % Pd/C, 5 wt % Pd/$BaSO_4$, 10 wt % Pd/$BaSO_4$, 5 wt % Pd/$BaCO_3$, 5 wt % Pd/$CaCO_3$, 10 wt % Pd/$CaCO_3$, 5 wt % Pd/$SrCO_3$, 5 wt % Pd/$TiO_2$, 5 wt % Ru/C, 5 wt % Ru/$Al_2O_3$ etc. In some embodiments, the catalyst is generated in-situ from a catalyst precursor. Examples of catalyst precursors include but are not limited to: $Pd(OAc)_2$, $PdCl_2$, $Pd(TFA)_2$, $Pd(acac)_2$ and $Pd_2(dba)_3$. In some embodiments, the catalyst is supported on insoluble matrices (or solid support, as described hereinbelow), such as inorganic oxides (for example alumina or silica optionally attached via tether) or organic insoluble polymers (such as for example cross-linked polystyrene). More examples of insoluble matrices include but not limited to: activated carbon, dried acidic activated carbon, $SiO_2$, $BaSO_4$, BN, $\gamma$-$Al_2O_3$ or $CeO_2$. In some embodiments, the active catalyst in the system, method and/or process of the invention is palladium on carbon, or Pd/C, wherein the palladium metal is supported on activated carbon in order to maximize its surface area and activity.

In some embodiments, the catalyst, or the catalyst precursor, each represents a separate embodiment according to this invention, is present in an amount of between 0.05% and 5% w/w based on the $H_2$-rich compound, between 0.01% and 1% w/w, between 0.1% and 1% w/w, between 0.15% and 0.5% w/w, between 0.1% and 0.7% w/w, between 0.1% and 0.5% w/w, between 0.05% and 0.5% w/w between 0.15% and 0.3% w/w, 0.15% w/w, 0.2% w/w, 0.3% w/w; each represents a separate embodiment according to this invention.

In some embodiments, the catalyst, or the catalyst precursor, each represents a separate embodiment according to this invention, is present in an amount of between 0.05% and 5% w/w based on the $H_2$-lean compound, between 0.01% and 1% w/w, between 0.1% and 1% w/w, between 0.15% and 0.5% w/w, between 0.1% and 0.7% w/w, between 0.1% and 0.5% w/w, between 0.05% and 0.5% w/w between 0.15% and 0.3% w/w, 0.15% w/w, 0.2% w/w, 0.3% w/w; each represents a separate embodiment according to this invention.

In some embodiments, the process/method of any of the embodiments of the present invention as described herein is conducted under neat conditions. In some embodiments, said system, process and/or method of the invention does not comprise any solvent. In some embodiments, said system and method of the invention further comprises at least one organic solvent. In some embodiments said at least one organic solvent is selected from benzene, toluene, o-, m- or p-xylene, mesitylene (1,3,5-trimethyl benzene), dioxane, THF, DME, DMSO, diglyme, DMF (dimethylformamide), valeronitrile, DMAC (dimethylacetamide), NMM (N-methylmorpholine), pyridine, n-BuCN, anisole, cyclohexane and combination thereof. In some embodiments, said system and method of the invention further comprises one organic solvent. In other embodiments said system and method of the invention further comprises a mixture of at least two organic solvents.

In another embodiment, the catalyst is absorbed on a solid support and the storing/loading and releasing/discharging hydrogen is done without a solvent.

In some embodiments, said system and method of the invention further comprise at least one acid. Examples of acids that may be included in the system, process and/or method of the invention include but not limited to: acetic acid (HOAc), benzoic acid (BA), carboxypolystyrene (CPS), polyacrylic acid (PAA), 4-methylbenzenesulfonic acid (p-TsOH) and mixtures thereof. In some embodiments, the acid is present in catalytic amount. In some embodiments, the acid is present in an amount of 0.01%, 0.05%, 0.1%, 0.2%, 0.3%, 0.4%, 0.5%, 0.6%, 0.7%, 0.8%, 0.9%, 1%, 5%, 10%, 15%, 25%, 35% w/w based on the amount of the N-heterocycle (e.g., substituted/unsubstituted pyridine, or substituted/unsubstituted piperidine); each represent a separate embodiment according to this invention. In some embodiments, the acid is a weak acid.

In some embodiments, the discharging of hydrogen is achieved by reacting a substituted/unsubstituted piperidine with a transition metal catalyst; thereby forming three hydrogen molecules and a substituted pyridine.

In some embodiments, the loading of hydrogen is achieved by reacting a substituted/unsubstituted pyridine with three hydrogen molecules and a transition metal catalyst; thereby forming a substituted/unsubstituted piperidine.

In some embodiments, the reversible hydrogen loading and discharging system, process and/or method of the invention has hydrogen storage capacity of at least 4%, at least 5%, at least 5.2%, at least 5.3%, at least 5.5%, at least 6%, at least 6.1%; each represents a separate embodiment according to this invention. In other embodiments, the reversible hydrogen loading and discharging system, process and/or method of the invention has hydrogen storage capacity of between about 4% to about 6.5%, between about 4% to about 6.3%, between about 5% to about 6.5%, between about 5.3% to about 6.1%, between about 4% to about 6.1%; each represents a separate embodiment according to this invention.

Figure 1D:
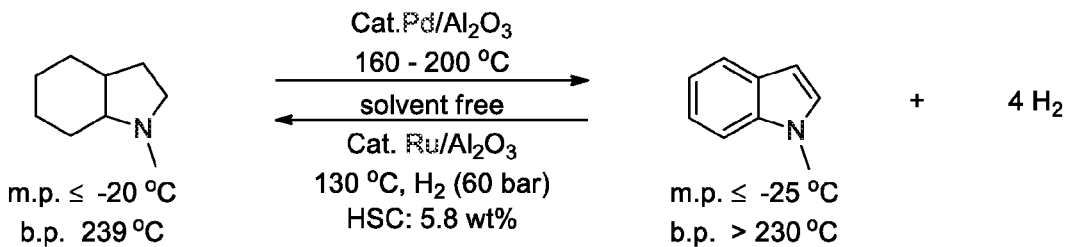

The reaction pathway for utilizing substituted/unsubstituted piperidines of the invention as a LOHC is outlined in FIG. 1D, which describes a LOHC system based on Pd catalyzed dehydrogenation and hydrogenation of N-heterocycles (substituted/unsubstituted piperidines/pyridines). Two couples of $H_2$-lean/$H_2$-rich compounds were found to be promising LOHCs for future use. One is 2-picoline/2-methylpiperidine system, which has 6.1 wt % theoretical hydrogen storage capacity, which satisfies the US DOE onboard hydrogen storage target 2020 very well. The other one is 2,6-lutidine/2,6-dimethylpiperidine system, which has 5.3 wt % theoretical hydrogen storage capacity, which is close to the US DOE target. All the compounds have wide liquid ranges and lower than 0° C. melting points. Both dehydrogenation and hydrogenation were achieved in excellent yields using the same catalyst under mild conditions. Particularly, for 2,6-lutidine/2,6-dimethylpiperidine system, the complete dehydrogenation of 2,6-dimetylpiperidine could be performed at 170° C., with fast and reliable $H_2$ release rate. Mechanistic studies revealed the special role of acids and acidic groups on the surface of activated carbon. Noteworthy, the reverse hydrogenation only required low pressure of $H_2$ (2-7 bar for 2-picoline, and 1.6-5 bar for 2,6-lutidine), which is the lowest known. Catalyst recycling, and interconversion experiments demonstrated that catalyst, 2,6-dimethylpiperidine and 2,6-lutidine have good stability.

System

A reversible hydrogen loading and discharging system of this invention refers to any type of arrangement capable to holding the reactants of the reactions performed in said system, wherein the discharging and loading of hydrogen molecules is performed using N-heterocylces and at least one transition metal catalyst as described hereinabove, preferably the N-heterocycles are substituted/unsubstituted piperidines (for hydrogen discharging), and substituted/unsubstituted pyridines (for hydrogen loading).

Upon reaction of substituted/unsubstituted piperidine with said at least one transition metal catalyst hydrogen molecules are released, to form the corresponding substituted/unsubstituted pyridine and hydrogen molecules.

Upon loading of hydrogen molecule, the substituted/unsubstituted pyridine is reacted with hydrogen molecules to form substituted/unsubstituted piperidine.

In one embodiment, this invention is directed to a LOHC system for the storage/loading and release/discharging of hydrogen ($H_2$) on demand, the system comprises N-heterocycle; and at least one transition metal catalyst.

In some embodiments, this invention relates to a liquid organic hydrogen carrier (LOHC) system for the storage of hydrogen ($H_2$), the system comprises (i) a substituted/unsubstituted pyridine and (ii) a transition metal catalyst, wherein said substituted/unsubstituted pyridine is capable of reacting with hydrogen ($H_2$) in the presence of said catalyst, under conditions sufficient to generate the corresponding substituted/unsubstituted piperidine, as a hydrogen storage system.

In some embodiments, this invention relates to a liquid organic hydrogen carrier (LOHC) system for releasing hydrogen ($H_2$), the system comprises (i) substituted/unsubstituted piperidine; and (ii) a transition metal catalyst, wherein said substituted/unsubstituted piperidine, is capable of being dehydrogenated in the presence of said catalyst, under conditions sufficient to generate substituted/unsubstituted pyridine, and molecular hydrogen.

In some embodiments, this invention relates to a liquid organic hydrogen carrier (LOHC) system for the storage and release of hydrogen ($H_2$) upon demand, the system comprises (i) a substituted/unsubstituted pyridine; (ii) a substituted/unsubstituted piperidine; and (iii) a first catalyst and a second catalyst as described hereinabove, wherein the first catalyst is capable of reacting with the substituted/unsubstituted pyridine under conditions sufficient to store hydrogen, and wherein the second catalyst is capable of reacting with a substituted/unsubstituted piperidine, under conditions sufficient to release hydrogen, upon demand as desired, and wherein the first and second catalyst may be the same or different.

In one embodiment, the discharging/release of hydrogen is achieved by reacting substituted/unsubstituted with said at least one transition metal catalyst; thereby forming three molecules of hydrogen and a substituted/unsubstituted pyridine.

In one embodiment, the loading/storage of hydrogen is achieved by reacting said substituted/unsubstituted pyridine with three molecules of hydrogen in the presence of said transition metal catalyst; thereby forming substituted/unsubstituted piperidine.

In one embodiment, this invention is directed to a LOHC system. In another embodiment, the LOHC system is used for a hydrogen fuel cell. In another embodiment, the LOHC system is used for fueling internal combustion engine. The LOHC of this invention release hydrogen on-board in vehicles powered by a hydrogen fuel cell, for internal combustion engine, or the LOHC systems store and release hydrogen at service stations, garages, central fleet refueling stations, and in residential individuals' homes, or other points of use. The release of the hydrogen is an on-site generation; and can be produced in individuals' homes or other points of use. Following the release of hydrogen, dehydrogenated compounds are taken to a specialized hydrogenation facility and the LOHC is recovered upon treatment with pressurized hydrogen and a catalyst.

In one embodiment, the LOHC system of this invention is used for dispensing and monitoring hydrogen-based fuel in a vehicle. The system is configured to store, release and dispense the hydrogen in the vehicle. The system also includes a fuel delivery system on the vehicle configured to deliver the hydrogen to the engine, and a control system configured to control the producing system and to monitor the use of the hydrogen by the vehicle.

This invention provides a method for releasing hydrogen gas from the LOHC of this invention and using the hydrogen gas for vehicles powered by a hydrogen fuel cell and/or for internal combustion engine.

In one embodiment, the LOHC can be pumped or poured for distribution to holding tanks and storage vessels. The liquid is easily transported using conventional methods for liquid transport and distribution (pipelines, railcars, tanker trucks). The hydrogen is generated on-site in the vehicle or by a dehydrogenation reactor system that delivers hydrogen and recovers the dehydrogenated substrate in a hydrogenation reactor site.

In one embodiment, the LOHC system of this invention for use in a vehicle comprises a reaction chamber configured to collect the LOHC and the catalyst of the invention; a heating element configured to heat the LOHC and the catalyst to release hydrogen; a buffer tank in flow communication with the reaction chamber configured to collect and temporarily store the hydrogen; a compressor system in flow communication with the buffer tank configured to pressurize the hydrogen to a selected pressure; a storage system in flow communication with the compressor system configured to store a selected quantity of the hydrogen the selected pressure; a dispensing system in flow communication with the storage system configured to dispense the hydrogen to the hydrogen fuel cell or to the internal combustion engine. A second dispensing system in flow communication with the reaction chamber configured to dispense spent of the reaction to a spent tank, wherein the dehydrogenated substrate is recovered in the presence of pressurized hydrogen. The recovery of the dehydrogenated substrate is done on-board or off-board.

Process

This invention further relates to a process for the storage and release of hydrogen ($H_2$) upon demand, comprising the steps of:
(a) when hydrogen storage is desired, reacting a substituted/unsubstituted pyridine, with hydrogen ($H_2$) in the presence of a first catalyst, under conditions sufficient to generate the corresponding substituted/unsubstituted piperidine; and
(b) when hydrogen release is desired, reacting a substituted/unsubstituted piperidine, with a second catalyst, under conditions sufficient to generate the corresponding substituted/unsubstituted pyridine, and hydrogen ($H_2$), wherein the first catalyst and the second catalyst may be the same or different.

In some embodiments, the first catalyst and the second catalyst are the same. In some embodiments, the catalyst is a Pd/C. In some embodiments, the catalyst is $Pd(OAc)_2$. In some embodiments, the catalyst is $Ru/Al_2O_3$. In some embodiments, the process does not comprise any solvent. In some embodiments, the hydrogen storage is carried out in mild temperature (e.g., between 50-180° C.). In some embodiments, the hydrogen storage is carried out under mild hydrogen pressure (e.g., between 1.5 and 8 bar). In some embodiments, the hydrogen release is carried out mild pressure (e.g., atmospheric pressure). In some embodiments, the hydrogen release is carried out in mild temperatures (e.g. between 100-180° C.).

In some embodiments, the catalyst is attached to a solid support, or in other embodiments, the catalyst is embedded on a solid support, or in other embodiments located on the surface of a solid support.

In some embodiments, the solid support comprises an inorganic material. Examples of inorganic material include but are not limited to: silica, alumina, magnesia, titania, zirconia, montmorillonite, phyllosilicate, zeolites, talc, clays, layered double hydroxides, apatites, silica gel, glass, glass fibers, nickel oxide and mixtures thereof. In other embodiments, the solid support comprises an organic polymer. Examples of organic polymers include but are not limited to: polyolefins, polyamides, polyethylene terephthalate, polyvinylchloride, polyvinylidenechloride, polystyrene, polymethracrylate, natural rubber, polyisoprene, butadiene-styrene random copolymers, butadiene acrylonitrile copolymers, polycarbonate, polyacetal, polyphenylenesulfide, cyclo-olefin copolymers, styrene-acrylonitrile copolymers, ABS, styrene-maleic anhydride copolymers, chloroprene polymers, isobutylene copolymers, polypropylene, polytetrafluoro ethylene, polyacrylic acid methylester, polymethacrylic acid methylester, polycarbonates, polyethylene glycol, poly(organo)siloxanes, and mixtures thereof.

Chemical Definitions

As used herein, the term alkyl, used alone or as part of another group, refers, in one embodiment, to a "$C_1$ to $C_8$ alkyl", "$C_1$ to $C_3$ alkyl" or "$C_1$ to $C_{10}$ alkyl" denotes linear and branched, groups, Non-limiting examples are alkyl groups containing from 1 to 3 carbon atoms ($C_1$ to $C_3$ alkyls), or alkyl groups containing from 1 to 4 carbon atoms ($C_1$ to $C_4$ alkyls). Examples of saturated alkyl groups include, but are not limited to, methyl, ethyl, n-propyl, isopropyl, n-butyl, iso-butyl, sec-butyl, tert-butyl, amyl, tert-amyl, and hexyl.

The alkyl group can be unsubstituted, or substituted with one or more substituents selected from the group consisting of halogen, hydroxy, alkoxy, aryloxy, alkylaryloxy, heteroaryloxy, oxo, cycloalkyl, phenyl, heteroaryls, heterocyclyl, naphthyl, amino, alkylamino, arylamino, heteroarylamino, dialkylamino, diarylamino, alkylarylamino, alkylheteroarylamino, arylheteroarylamino, acyl, acyloxy, nitro, carboxy, carbamoyl, carboxamide, cyano, sulfonyl, sulfonylamino, sulfinyl, sulfinylamino, thiol, alkylthio, arylthio, or alkylsulfonyl groups. Any substituents can be unsubstituted or further substituted with any one of these aforementioned substituents. By way of illustration, an "alkoxyalkyl" is an alkyl that is substituted with an alkoxy group.

The following examples are presented in order to more fully illustrate the preferred embodiments of the invention. They should in no way, however, be construed as limiting the broad scope of the invention.

EXAMPLES

General Information

All experiments with metal complexes were carried out under an atmosphere of purified nitrogen in a Vacuum Atmospheres glove box equipped with a MO 40-2 inert gas purifier or using standard Schlenk techniques. All solvents were reagent grade or better. All non-deuterated solvents were purified according to standard procedures under argon atmosphere. Deuterated solvents were used as received. All solvents were degassed with $N_2$ and kept in the glove box. Most of the chemicals used in the catalytic reactions were purified according to standard procedures.

$^1$H NMR spectra were recorded at 300 MHz, using a Bruker AMX-300 NMR spectrometer. Measurements were done at ambient temperature, as noted for each experiment. $^1$H NMR chemical shifts are referenced to the residual hydrogen signals of the deuterated solvent. GSMS analysis was performed on Agilent 7820A/5975C GCMS system with MS detector, and helium as carrier gas. EDS was recorded at EDS Bruker XFlash/60 mm, using Zeiss Ultra 55 Scanning Electron Microscope. Transmission electron microscopes (TEM) were recorded at JEM-2100 Electron Microscope.

Example 1

Dehydrogenation of 2-methylpiperidine to 2-picoline

2-Methylpiperidine was chosen as the model $H_2$-rich compound, since it has 6.1 wt % potential hydrogen storage capacity, and the electron-donating methyl group at 2-position could provide some benefits regarding both electronic and steric effects. Several kinds of heterogeneous catalysts were screened in p-xylene as a solvent (more details hereinbelow). Palladium on activated carbon (Pd/C, 4 wt %) was found to be the most efficient catalyst for the acceptorless dehydrogenation of 2-methylpiperidine to 2-picoline. Then, Pd/C was studied as a catalyst for solvent-free dehydrogenation of 2-methylpiperidine. Applying commercial Pd/C (5 wt %) resulted in 42-48% yield of 2-picoline and 9-10% side products, depending on the supplier (Table 2, entries 1 and 2). Importantly, addition of a catalytic amount of acetic acid (entry 3) improved the reaction in both yield (60%) and selectivity (only ~3% of byproducts were formed).

TABLE 2

Optimization of 2-methylpiperidine dehydrogenation[a]

2-methylpiperidine $\xrightarrow[\text{neat, 170° C., 48 h}]{\text{Cat.}}$ 2-picoline + $3H_2$

| Entry | [Pd] | Support | 2-Picoline (%) | Byproducts (%) |
|---|---|---|---|---|
| 1 | Pd/C (Fluka) | — | 42 | 9 |
| 2 | Pd/C (BDH) | — | 48 | 10 |
| 3[b] | Pd/C (Fluka) | — | 60 | 3 |
| 4[c] | Pd(OAc)$_2$ | AC | 72 | 10 |
| 5[c] | PdCl$_2$ | AC | 2 | 0 |
| 6[c] | Pd(TFA)$_2$ | AC | 6 | 0 |
| 7[c] | Pd$_2$(dba)$_3$ | AC | 6 | 0 |
| 8[c] | Pd(acac)$_2$ | AC | 24 | 9 |
| 9[c] | Pd(OAc)$_2$ | SiO$_2$ | 3 | 0 |
| 10[c] | Pd(OAc)$_2$ | BN | 8 | 0 |
| 11[c] | Pd(ONc)$_2$ | γ-Al$_2$O$_3$ | 9 | 0 |
| 12[c] | Pd(OAc)$_2$ | CeO$_2$ | 12 | 0 |
| 13 | Pd(OAc)$_2$ | — | 3 | 0 |

[a]Conditions: 2-methylpiperidine (10 mmol), catalyst (0.2 mol % of [Pd]), 170° C. (oil bath temperature, internal temperature is 119° C.), open system under argon flow on the top of the condenser, with cold water circulation. Yields and conversions were determined by GC, using n-heptane as an internal standard.
[b]HOAc (0.04 mmol).
[c]Support (50 mg).
Pd(TFA)$_2$ = palladium(II) trifluoroacetate,
Pd$_2$(dba)$_3$ = tris(dibenzylideneacetone)dipalladium(0),
Pd(acac)$_2$ = Palladium(II) acetylacetonate,
AC = activated carbon,
BN = boron nitride.

Further, an in situ catalyst generation strategy was planned. Pd(OAc)$_2$ was chosen as the palladium precursor, dried acidic activated carbon (Darco@KB, surface area: 1500 n/g, pH$_{PZC}$=4.25: pH value at the point of zero charge) as the support for a preliminary attempt, in which Pd/C and 2 equivalent of acetic acid (with respect to Pd) could potentially be generated. This in situ generated palladium catalyst is more active than the pre-prepared commercial ones, resulting in 72% yield of 2-picoline (entry 4). Other palladium sources including PdCl$_2$, Pd(TFA)$_2$, Pd$_2$(dba)$_3$, and Pd(acac)$_2$ had much lower catalytic activities than Pd(OAc)$_2$ (entries 5-8). Next, Pd(OAc)$_2$ was chosen as the best palladium precursor to study the effect of supports (Table 2, entries 9-12). Replacing activated carbon by $SiO_2$, BN, $\gamma$-$Al_2O_3$ or $CeO_2$, very low yields of 2-picoline were obtained. In the absence of support, only 3% of 2-picoline was detected, and a palladium mirror was observed at the bottom of Schlenk tube, showing that a $Pd^0$ species was generated in the reaction system. Thus, the combination of $Pd(OAc)_2$ and activated carbon is the most efficient catalyst for 2-methylpiperidine dehydrogenation.

Figure 2A:
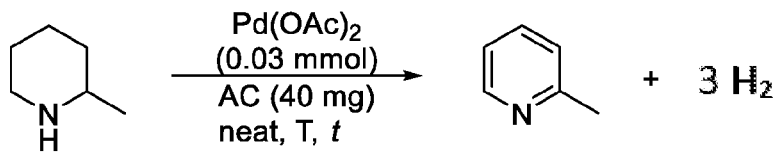
FIGS. 2A-2B depict the dehydrogenation process of 2-methylpiperidine catalyzed by $Pd(OAc)_2$/activated carbon.
Figure 2B:
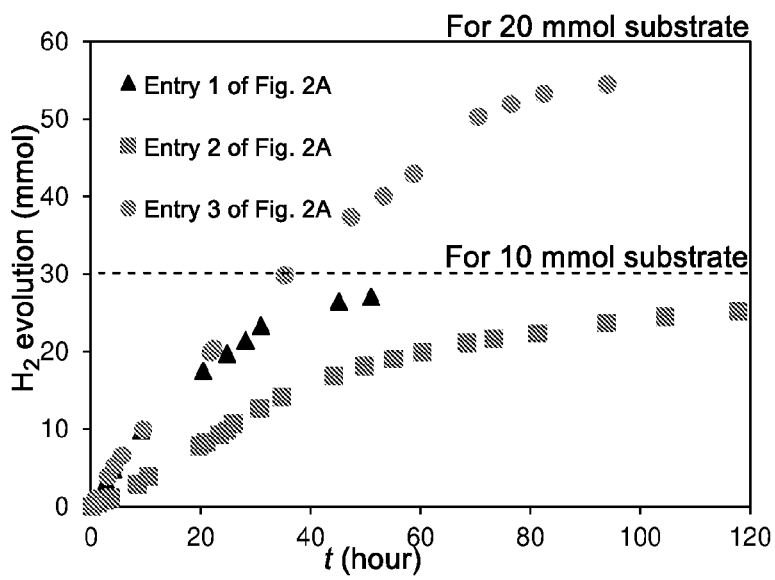
Figure 3:
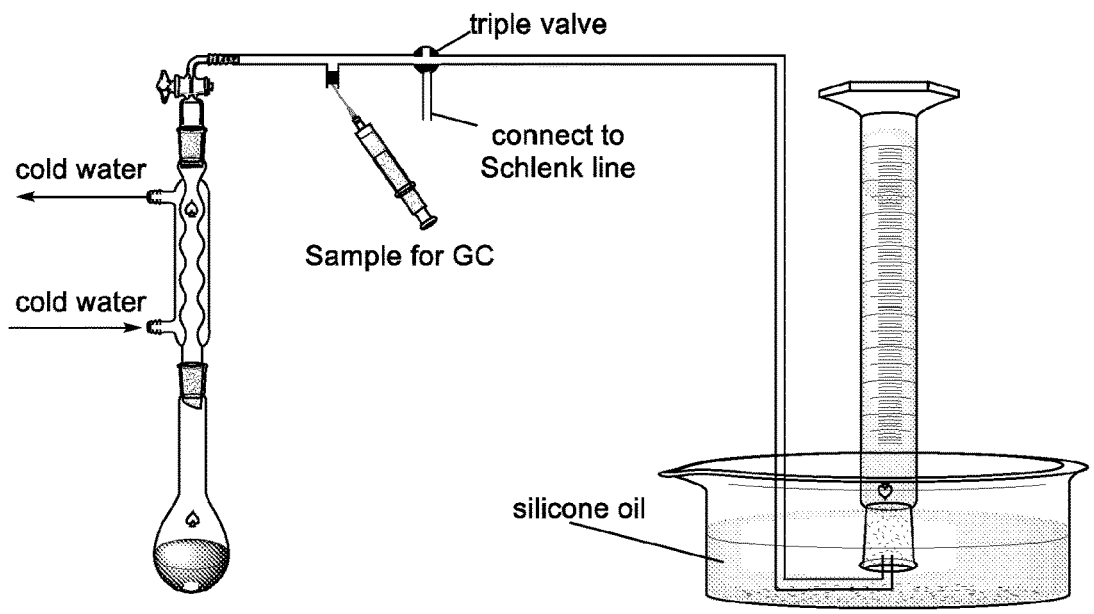
FIG. 3 depicts a schematic drawing of the gas collection system that was utilized in the experiments.
Figure 4:
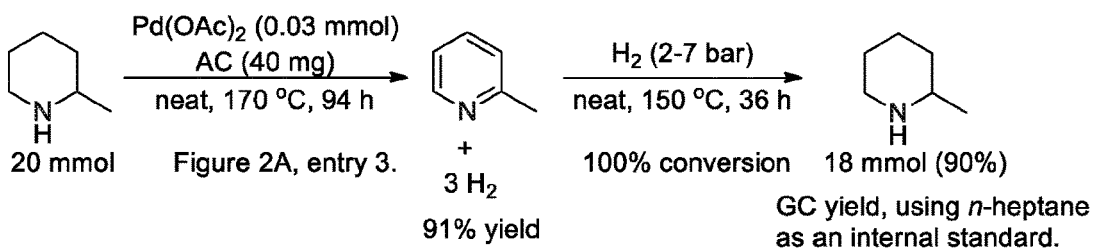
FIG. 4 depicts the reversible interconversion of 2-methylpiperidine and 2-picoline process of the invention, catalyzed by Pd catalyst.

Next, the reaction was connected to a gas collection system (FIG. 3), for recording the time-dependent $H_2$ release curves. As shown in FIGS. 2A-2B, under the catalysis of $Pd(OAc)_2$/activated carbon ($Pd(OAc)_2$=0.03 mmol, AC=40 mg), at 170° C. (bath temperature, internal temperature is 119° C.), 27.1 mmol (90% yield) of $H_2$ was attained after 51 hours (entry 1, triangle ▲). The dehydrogenation was also achieved at a lower bath temperature; at 150° C. (internal temperature is also 119° C.), after 117 hours, $H_2$ in 84% yield was collected (entry 2, square ■). Moreover, with the same amount of catalyst, doubling the scale of 2-methylpiperidine, the dehydrogenation (entry 3, dot ●) was even faster, and produced 54.5 mmol (91% yield) of $H_2$ after 94 hours. Gratifyingly, the reverse hydrogenation could be accomplished by directly pressurizing the same reaction mixture with $H_2$. Under 2-7 bar of $H_2$, 2-picoline in the mixture was fully converted to 2-methylpiperidine in 90% yield (FIG. 4). These results indicate that dehydrogenation and hydrogenation were catalyzed by the same single metal heterogeneous catalyst, and the total amount of byproducts was less than 10%.

Figure 5A:
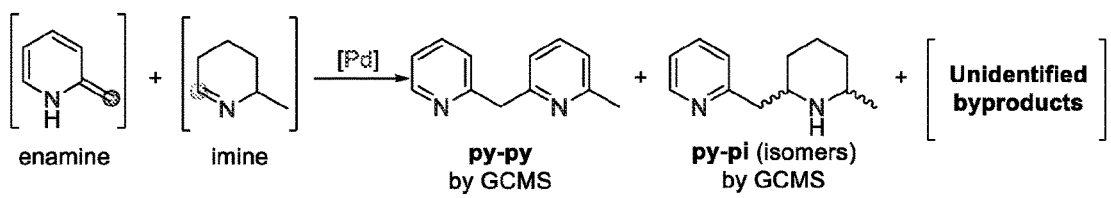
FIGS. 5A-5B depict the byproducts analysis and selectivity controlling strategies for the system/process of the invention.
Figure 5B:
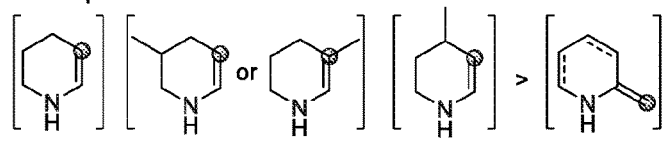
Figure 5B:
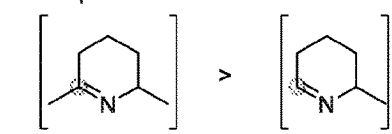

In order to understand the process of side reactions, the mixture of side products was analyzed by GC-MS. These byproducts have similar retention times (some of them partially overlap, see hereinbelow) and similar molecular weights, likely py-py and py-pi, which were probably formed via the palladium catalyzed addition of enamine to imine (FIG. 5A). Therefore, restraining the addition of enamine to imine might be an effective method to improve the selectivity. The strategy was to increase the steric hindrance of both nucleophilic and electrophilic intermediates (FIG. 5B).

Experimental Details:

Dehydrogenation of 2-methylpiperidine to 2-picoline in a Solvent: In a glovebox, catalyst, t-BuOK (0.2 mmol), 2-methylpiperidine (1 mmol) and solvent (1 mL) were added to a Schlenk tube. The Schlenk tube was equipped with a condenser and the solution was refluxed with stirring in an open system under argon flow on the top of the condenser for the specified time. After cooling to room temperature, the conversion and yield were determined by GC using n-heptane as an internal standard.

TABLE 3

Heterogeneous catalysts for 2-methylpiperidine dehydrogenation in a solvent

| Entry | Cat. (mol %) | Additives (mol %) | 2-Picoline (%) |
|---|---|---|---|
| 1 | 5 wt % Ru/C (2.4) | t-BuOK (20) | 0 |
| 2 | 4 wt % Pd/C (1.9) | t-BuOK (20) | 9.6 |
| 3 | 4 wt % Pd/$Al_2O_3$ (1.9) | t-BuOK (20) | 0 |

TABLE 3-continued

Heterogeneous catalysts for 2-methylpiperidine dehydrogenation in a solvent

| Entry | Cat. (mol %) | Additives (mol %) | 2-Picoline (%) |
|---|---|---|---|
| 4 | 5 wt % Pt/C (1.3) | t-BuOK (20) | 1.6 |
| 5 | 5 wt % Pd/$BaSO_4$ (2.5) | t-BuOK (20) | 0 |
| 6 | 4 wt % Pd/C (1.9) | — | 72 |
| 7 | 4 wt % Pd/C (1.9) | p-TsOH (10) | 61 |
| 8 | 5 wt % Co/C (4.2) | — | 0 |
| 9 | 5 wt % Ni/C (4.2) | — | 0 |

Conditions: 2-methylpiperidine (1 mmol), catalyst (50 mg), additive, and p-xylene (1 mL), 170° C. (oil bath), open system, with argon flow on the condenser top, yields and conversions were determined by GC, using n-heptane as an internal standard.
p-TsOH = 4-methylbenzenesulfonic acid.

Solvent-Free Dehydrogenation of 2-methylpiperidine: In a glovebox, 2-methylpiperidine (10 mmol), 43 mg of 5 wt % Pd/C or (4.5 mg of $Pd(OAc)_2$ and 50 mg of support) were added to a Schlenk tube. The Schlenk tube was equipped with a condenser and the solution was refluxed with stirring in an open system under argon flow for the specified time. After cooling to room temperature, the conversion and yield were determined by GC using n-heptane as an internal standard (results are given in Table 2 and Table 4).

TABLE 4

Solvent-free dehydrogenation of 2-methylpiperidine catalyzed by other metal

| Entry | [Pd] | Support | 2-Picoline (%) | Byproducts (%) |
|---|---|---|---|---|
| 1 | Ru(methylallyl)$_2$(COD) | AC | 0 | 0 |
| 2 | Ni(COD)$_2$ | AC | 0 | 0 |

Figures 10, 11:
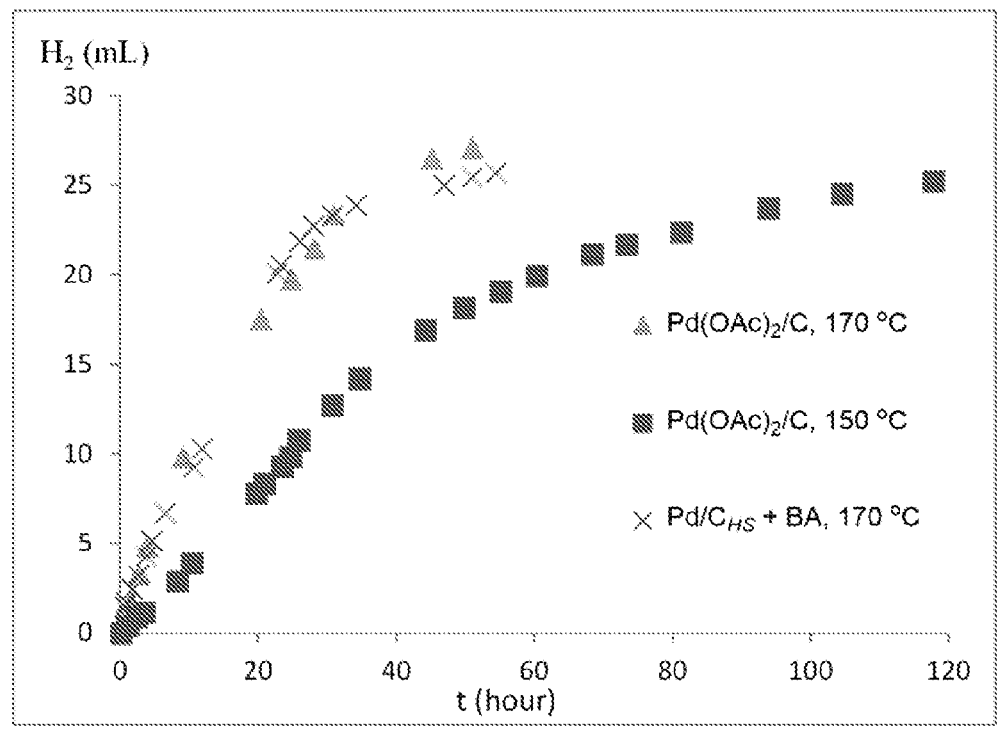
FIG. 10 depicts the time-dependent $H_2$ release curves of 2-methylpiperidine dehydrogenation.
FIG. 11 depicts the influence of $Pd(OAc)_2$ and activated carbon concentrations on the dehydrogenation activity. Condition: 2,6-dimethylpiperidine (10 mmol), 170° C. (oil bath temperature).

Solvent-Free Dehydrogenation of 2-methylpiperidine (Connected to a Gas Collection System): In a glovebox, 2-methylpiperidine and the catalyst were added to a Schlenk tube (see Table 5). The Schlenk tube was equipped with a condenser, which was connected to a gas collection system (FIG. 3). The volume of $H_2$ was recorded by the collection system, and time-dependent $H_2$ release curves are shown in FIG. 10. Yields and conversions were determined by GC based on the peak area. Yield of $H_2$ was calculated on basis of $H_2$ volume with respect to full conversion of 2-methylpiperidine to 2-picoline (10 mmol of 2-methylpiperidine can produce 30 mmol of $H_2$, 740 mL at 28° C.).

TABLE 5

Dehydrogenation of 2-methylpiperidine with Pd catalyst

| Entry | [Cat] | Additive | 2-methyl piperidine (mmol) | T (° C.) | t (h) | Conv (%) | 2-Picoline (%) | $H_2$ mL (%)[a] |
|---|---|---|---|---|---|---|---|---|
| 1 | Pd(OAc)$_2$ | AC (40 mg) | 10 | 170 | 51 | 100 | 87 | 668 (90) |
| 2 | Pd(OAc)$_2$ | AC (40 mg) | 10 | 150 | 118 | 98 | 86 | 632 (85) |
| 3 | Pd/C$_{HS}$ | BA[b] | 10 | 170 | 55 | 94 | 77 | 634 (86) |

Note:
[a] ambient temperature = 27-30° C. (30 mmol of $H_2$ is about 740 mL).
[b] BA = benzoic acid (0.06 mmol)
AC = activated carbon,
Pd/C$_{HS}$ = palladium on activaed carbon for Hydrogen Storage.

TABLE 6

Measurement of the relative GC response factors of 2-methylpiperidine/n-heptane and 2-picoline/n-heptane

| | n-heptane (mg) | 2-methyl piperidine (mg) | 2-picoline (mg) | n-heptane (peak area) | 2-methyl piperidine (peak area) | 2-picoline (peak area) |
|---|---|---|---|---|---|---|
| Mixture 1 | 39.8 | 19.3 | 92 | 5020 | 1738 | 10802 |
| Mixture 2 | 39.6 | 32.8 | 74 | 5005 | 3302 | 9082 |
| Mixture 3 | 40 | 50.9 | 55.6 | 5304 | 5346 | 6867 |
| Mixture 4 | 39.2 | 67.3 | 37.3 | 5026 | 6820 | 4424 |
| Mixture 5 | 39.5 | 83.3 | 19.3 | 5427 | 9343 | 2502 |

GC conditions (for organic compounds): HP 6890 or Agilent 7890B Series GC System; Column: HP-5, 30 m, 320 μm, Inlets: 280° C.; Detector: FID 280° C.; Carrier Gas: He; Flow: 1 mL/min; Oven: 50° C., hold 8 min; 15° C./min to 280° C., hold 2 min

Example 2

Optimization of an N-Heterocycle-Based Solvent-Free, Liquid to Liquid LOHC System
The Effect of Substitution on the Dehydrogenation Process With the idea of increasing steric hindrance, the effect of the substituent group was studied. Piperidine, 3-methylpiperidine, 4-methylpiperidine and 2,6-dimethylpiperidine were investigated (Table 7). Using piperidine or 3-methylpiperidine as the $H_2$-rich compounds resulted in good selectivity, but low yields of the $H_2$-lean products (entries 1 and 2). Using 4-methylpiperidine resulted in 46% yield of 4-picoline and about 7% of byproducts (entry 3).

TABLE 7

Dehydrogenation of piperidine and methylpiperidines

| Entry | $H_2$-rich compound | $H_2$-lean compound (%) | Byproducts |
|---|---|---|---|
| 1[a] | piperidine | pyridine (11) | trace |
| 2[b] | 3-methylpiperidine | 3-picoline (11) | trace |
| 3[c] | 4-methylpiperidine | 4-picoline (46) | 7 |

TABLE 7-continued

Dehydrogenation of piperidine and methylpiperidines

| Entry | $H_2$-rich compound | $H_2$-lean compound (%) | Byproducts |
|---|---|---|---|
| 4[b,c] | 2,6-dimethylpiperidine | 2,6-lutidine (>99) | 0 |
| 5[c,d] | 2,6-dimethylpiperidine | 2,6-lutidine (100) | 0 |

[a] Conditions: piperidines (10 mmol), catalyst (0.2 mol % of [Pd]), activated carbon (Darco @ KB, 50 mg), 170° C. (oil bath temperature), open system under argon flow on the top of condenser, with cold water circulation. Yields and conversions were determined by GC, using n-heptane as an internal standard.
[b] Determined by on $^1$H NMR, using mesitylene as an internal standard.
[c] Determined by GC, based on the peak areas.
[d] Open system, argon atmosphere, the condenser was connected to a gas collection system.

Using 2,6-dimethylpiperidine resulted in more than 99% yield and 100% selectivity (entry 4). Importantly, the quantitative dehydrogenation of 2,6-dimethylpiperidine could also be achieved without argon flow and gave 100% yield of pure $H_2$ gas ($H_2$ purity>99.99%, confirmed by GC with thermal conductivity detector, no impurity was observed). Thus, it is also promising to establish a LOHC system on basis of 2,6-lutidine/2,6-dimethylpipeidine with the same catalyst system.

A LOHC system based on 2,6-lutidine/2,6-dimethylpiperidine has a maximum 5.3 wt % gravimetric capacity, which is higher than the European Union target, and very close to the US DOE target. In addition, physicochemical properties of 2,6-lutidine and 2,6-dimethylpiperidine meet all the requirements of an ideal LOHC. Thus, an LOHC system based a 2,6-lutidine/2,6-dimethylpieridine based LOHC system is attractive.

Figures 6A, 6B:
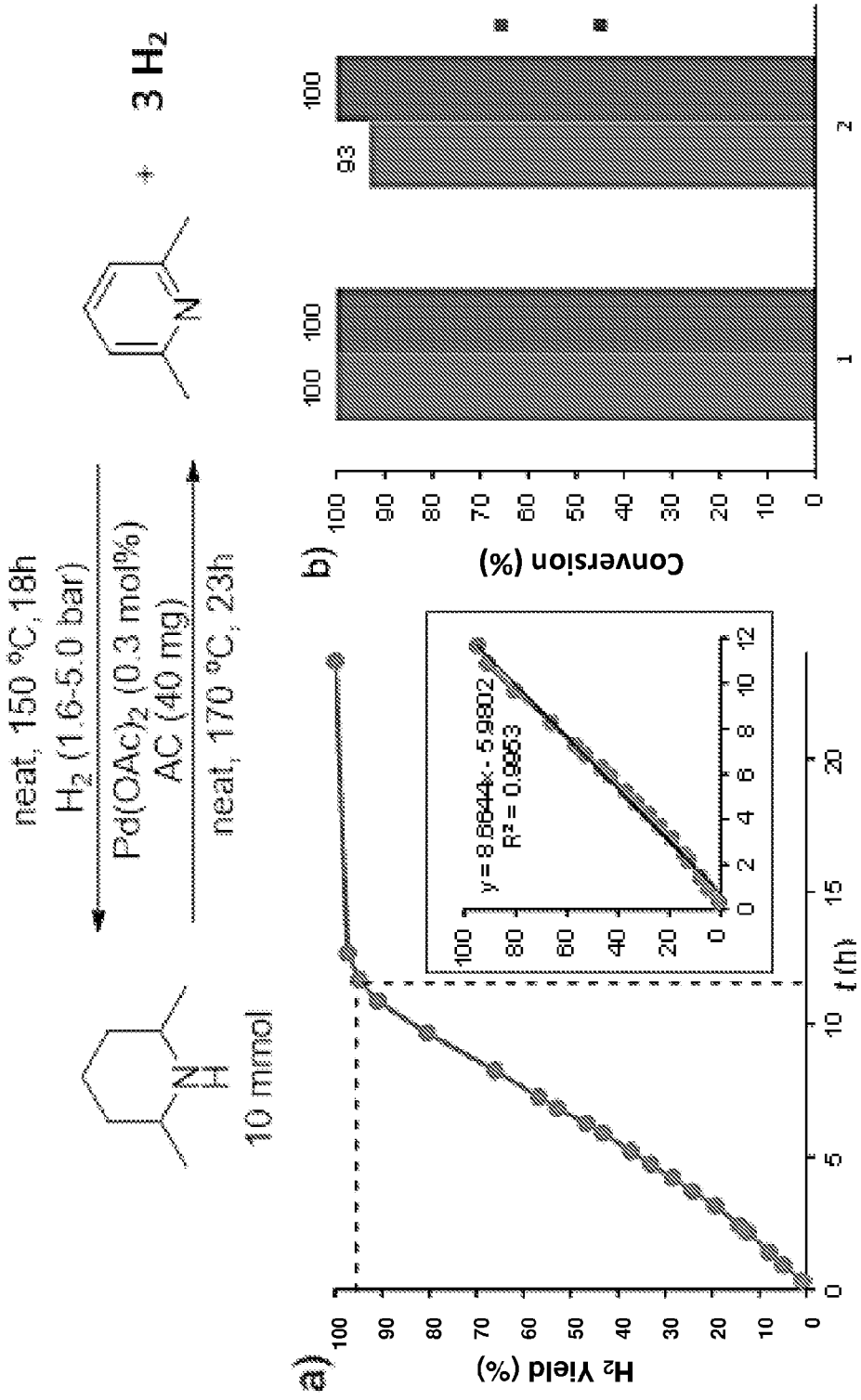
FIGS. 6A-6B depict the palladium based catalyst catalyzed interconversion of 2,6-dimethylpipridine and 2,6-lutidine.

The time-dependent $H_2$ release curves for 2,6-dimethylpiperidine dehydrogenation was recorded by the gas collection system (FIGS. 6A-6B). Under the catalysis of Pd (Pd(OAc)$_2$=6.7 mg, 0.3 mol %, AC=40 mg), the dehydrogenation of 2,6-dimethylpiperidine worked very well, yielding 97% of $H_2$ after 13 hours, and 100% of $H_2$ after 23 hours (FIG. 6A). Interestingly, the $H_2$ release rate was constant before reaching 95% yield of $H_2$ (FIG. 6A, inset) in 12 hours. These results suggest a zero-order reaction in 2,6-dimethylpiperidine, as a result of saturation of the surface of catalyst by 2,6-dimethylpiperidine. Besides, by measuring the H₂ release rates using different catalyst loadings, a first-order rate dependence in Pd is likely.

Moreover, the reverse hydrogenation of 2,6-lutidine to 2,6-dimethylpiperidine regeneration was achieved in 100% yield by pressurizing the mixture with 1.6-5 bar of H₂, at 150° C. for 18 hours (FIG. 6B, right column 1). The resulting mixture could be reused for the second round of dehydrogenation (93% yield, FIG. 6B, left column 2) and hydrogenation (100% yield, FIG. 6B, right column 2), and no decomposition of 2,6-dimethylpiperidine and 2,6-lutidine took place. Additionally, with 0.3 mol % of catalyst, under H₂ pressure of 30-50 bar, at 150° C., the hydrogenation of 2,6-lutidine yielded 2,6-dimethylpiperidine in 87%, 95% and 98% yields, after 1.5 h, 2 h and 3 h, respectively, which enables fast H₂ loading (Details see hereinbelow).

Thus, an N-heterocycle-based solvent-free, liquid to liquid LOHC system was established, catalyzed by a single catalyst for both dehydrogenation and hydrogenation under relatively mild conditions.

Experimental Data:

Solvent-Free Dehydrogenation of 2,6-dimethylpiperidine to 2,6-lutidine (Connected with Gas Collection System): In a glovebox, 2,6-dimethylpiperidine (10 mmol) and catalyst were added to a Schlenk tube equipped with a condenser, which was connected to a gas collection system (FIG. 3). The solution was refluxed with stirring in an open system for the specified time. Yield of H₂ was calculated on basis of the formed H₂ volume with respect to full conversion of 2,6-dimethylpiperidine to 2,6-lutidine (30 mmol of H₂, 721 mL at 20° C., 740 mL at 28° C.). After cooling to room temperature, the conversions and yields were determined by ¹H NMR using mesitylene as an internal standard, or by GC based on the peak area.

GC Conditions (for Organic Compounds): HP 6890 or Agilent 7890B Series GC System; Column: HP-5, 30 m, 320 μm, Inlets: 280° C.; Detector: FID 280° C.; Carrier Gas: He; Flow: 1 mL/min; Oven: 50° C., hold 8 min; 15° C./min to 280° C., hold 2 min.

TABLE 9-continued

Relationship between [Pd] and H₂ release rate

| Entry | Pd(OAc)₂ (mmol) | Rate (mmol H₂ per hour) |
|---|---|---|
| 3 | 0.02 | 1.3495 |
| 4 | 0.03 | 2.6471 |

$k_{obs} = 92.066$

GC conditions (for gas analysis): HP 6890 Series CC System; column: SUPELCO 1-2382, 5 Ft×⅛ In S.S. SUPPORT 45/60 CARBOXEN™ 1000, Packed Column. Inlets: 87° C.; Detector: TCD 250° C.; Carrier Gas: He; Flow: 29.1 mL/min; Oven: 35° C., hold 2 min; 10° C./min to 60° C., hold 0 min; 30° C./min to 200° C.

For the Calculation of Average Turnover Frequency within 90% Yield (ATOF₉₀): In a glovebox, 2,6-dimethylpiperidine (10 mmol), Pd/C$_H$S ([Pd]=0.03 mmol) and acid (0.06 mmol) were added to a Schlenk tube equipped with a condenser, which was connected to a gas collection system (FIG. 3). The solution was refluxed with stirring in an open system for the specified time. Yield of H₂ was calculated on basis of the formed H₂ volume with respect to full conversion of 2,6-dimethylpiperidine to 2,6-lutidine (30 mmol of H₂, 721 mL at 20° C., 740 mL at 28° C.). After cooling to room temperature, the conversions and yields were determined by GC. The calculation of ATOF₉₀s were based on the H₂ release rates (not shown).

Example 3

General Procedure for Hydrogenation of Pyridines

In a glovebox, a 50 mL stainless steel autoclave lined with a Teflon tube (or a 90 mL Fisher Porter tube) containing a stir bar was charged with the catalyst (Pd or Ru) and 2,6-lutidine. After purging with H₂ (10 atm×2), the autoclave

TABLE 8

Heterogeneous catalysts for dehydrogenation of 2,6-dimethylpiperidine

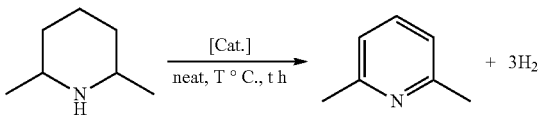

| Entry | Cat. (mol %) | Support (mg) | T (° C.) | t (h) | 2,6-Lutidine | H₂ (%) |
|---|---|---|---|---|---|---|
| 1 | Pd(OAc)₂ (0.2) | AC (50) | 170 | 48 | 100 | 99 |
| 2 | Pd(OAc)₂ (0.2) | AC (50) | 150 | 39 | 78 | 76 |
| 3 | Pd(OAc)₂ (0.3) | — | 170 | 48 | 5 | 6 |
| 4 | 5 wt % Ru/Al₂O₃ (0.2) | — | 170 | 48 | 0 | 0 |
| 5 | 5 wt % Pt/C (1.3) | — | 170 | 48 | 37 | 35 |
| 6 | 4 wt % Pd/MCM-48 (0.2) | — | 170 | 48 | 35 | 34 |

Conditions: 2,6-dimethylpiperidine (10 mmol) and catalyst, oil bath temperature, open system, the condenser was connected to a gas collection system, yields of 2,6-lutidine were determined by GC based on the peak area.

TABLE 9

Relationship between [Pd] and H₂ release rate

| Entry | Pd(OAc)₂ (mmol) | Rate (mmol H₂ per hour) |
|---|---|---|
| 1 | 0.0067 | 0.49 |
| 2 | 0.0156 | 1.0832 | was pressurized with H₂ (pressure see Table 10). The mixture was stirred at 150° C., H₂ decreased to a specified pressure, then cooled to room temperature and pressurized with H₂ again (repeat a few times). Table 11, provides results of 5 repeats of hydrogenation. When the pressure didn't decrease, the autoclave was cooled to room temperature, and H₂ released carefully. Then centrifugation to separate the catalyst and product, 50 μL of the clear solution was withdrawn and measured by $^1$H NMR in CDCl$_3$ and GC. After distillation, pure 2,6-dimethylpipridine was obtained for further use.

TABLE 10

Hydrogenation of 2,6-lutidine to 2,6-dimethylpiperidine[a]

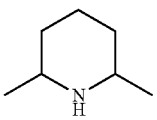

| Entry | Cat. (mol %) | H$_2$ (bar) | T (° C.) | t (hours) | Yield (%) |
|---|---|---|---|---|---|
| 1[b,e] | Ru/Al$_2$O$_3$ (0.2) | 15-60 | 150 | 15 | 100 |
| 2[c,e] | Ru/Al$_2$O$_3$ (0.07) | <4-50 | 150 | 30 | 100 |
| 3[d,f] | Ru/Al$_2$O$_3$ (0.2) | 2.6-5 | 150 | 23 | 83 |
| 4[d,f] | Pd(OAc)$_2$/AC (0.2) | 1.6-5 | 150 | 23 | 95 |
| 5[d,f] | Pd(OAc)$_2$/AC (0.3) | 1.6-5 | 150 | 18 | 100 |
| 6[d,f] | Pd(OAc)$_2$/AC (0.3) | 2.5-5 | 100 | 18 | 57 |
| 7[d,f] | Pd(OAc)$_2$/AC (0.3) | 3.5-5 | 50 | 18 | 6 |
| 8[d,e] | Pd(OAc)$_2$/AC (0.3) | 30-50 | 150 | 1.5/2/3 | 87/95/98 |

[a]Conditions: catalyst loading, H$_2$ pressure, bath temperature, and reaction time are shown in the Table, yields of 2,6-dimethylpiperidine are determined by GC based on the peak area.
[b]2,6-Lutidine (54 mmol).
[c]2,6-Lutidine (72 mmol).
[d]2,6-Lutidine (10 mmol).
[e]In a 50 mL steel autoclave with Teflon tube.
[f]In a 90 mL Fisher-porter tube

TABLE 11

Catalyst reuse (following each hydrogenation step, the catalyst was isolated and recycled) for hydrogenation of 2,6-lutidine to 2,6-dimethylpiperidine

| t (h) | Conversion (A) |
|---|---|
| 1$^{st}$ hydrogenation | 8 | 100 |
| 2$^{nd}$ hydrogenation | 8 | 100 |
| 3$^{rd}$ hydrogenation | 10 | 98 |
| 4$^{th}$ hydrogenation | 12 | 100 |
| 5$^{th}$ hydrogenation | 15 | 100 |

Example 4

Mechanistic Investigation of the Catalytic Process—Control Experiments

Figure 7A:
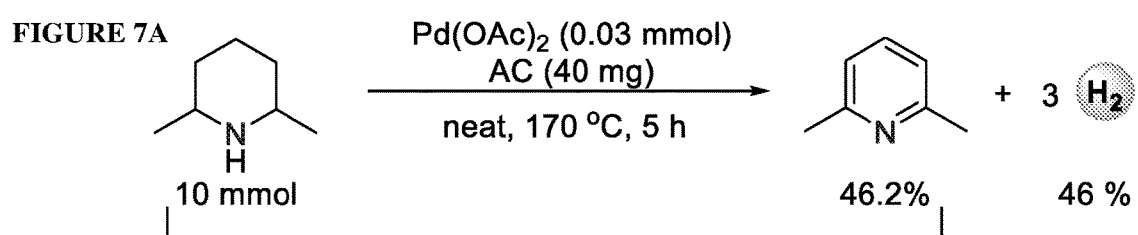
FIGS. 7A-7B depicts the control experiments carried out for the mechanistic studies.
Figure 7B:
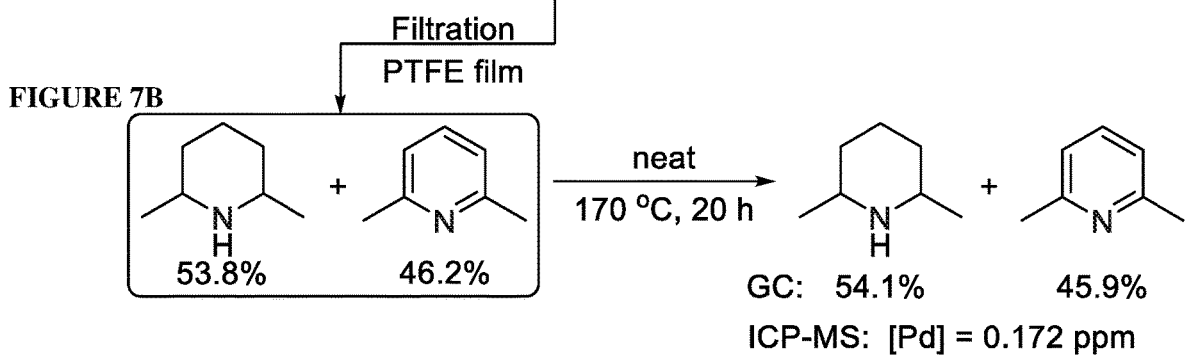
Figure 7C:
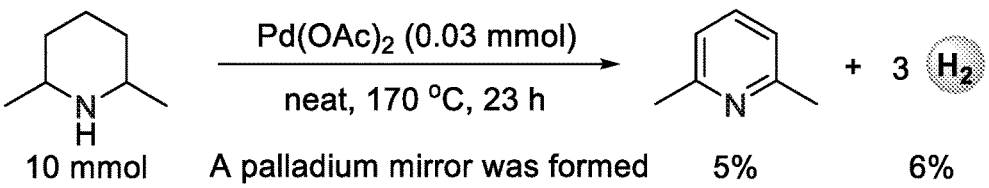
FIG. 7C: $Pd(OAc)_2$ catalyst without activated carbon support.

A few control experiments were carried out to find out if the catalytic dehydrogenation involves homogeneous or heterogeneous catalysis. When 0.3 mol % of Pd(OAc)$_2$, 40 mg of activated carbon, and 10 mmol of 2,6-dimethylpiperidine were heated at 170° C. (bath temperature, internal temperature is 128° C.) for 5 hours, 46% yield of H$_2$ was collected, which match the yield (46.2%) of the formed 2,6-lutidine very well (FIG. 7A). The mixture was filtered using a Teflon syringe filter (0.22 µm pore size PTFE) to give a colorless mixture of 2,6-dimethylpiperidine and 2,6-lutidine. Heating the obtained mixture at 170° C. for another 20 hours, no gas was formed, and the amount of 2,6-lutidine also didn't change (45.9%, FIG. 7B). Thus, a homogeneous catalysis process is unlikely. Analyzing the final mixture by ICP-MS showed only 0.172 ppm of Pd, indicating that virtually no Pd leaching to the reaction solution took place. Thirdly, a reaction without using a support gave only 5% yield of 2,6-lutidine and generated a Pd mirror (FIG. 7C). Taken together these results show that a homogeneous process can be ruled out.

Experimental Details:

Control Experiments: In a glovebox, 2,6-dimethylpiperidine (1.13 g, 10 mmol), Pd(OAc)$_2$ (6.7 mg, 0.03 mmol) and activated carbon (40 mg) were added to a Schlenk tube. The Schlenk tube was equipped with a condenser, which was connected to a gas collection system. The solution was refluxed with stirring in an open system for 5 hours. H$_2$ was collected (331 mL, 46% yield). After cooling to room temperature, the reaction mixture was filtered using a Teflon syringe filter (0.22 µm pore size PTFE) to give a colorless mixture of 2,6-dimethylpiperidine (53.8%) and 2,6-lutidine (46.2%). Then the mixture of 2,6-dimethylpiperidine and 2,6-lutidine was transferred to a new Schlenk tube, and refluxed for another 20 hours, but no gas was collected. After cooling to room temperature, samples were taken for GC and ICP-MS analysis.

Example 5

Mechanistic Investigation—the Effect of the Acid on the Dehydrogenation Process

Pd/C$_{HS}$ (Pd/C$_{HS}$=palladium on activated carbon for Hydrogen Storage) was prepared from Pd(OAc)$_2$ and acidic activated carbon (Darco@KB) to study the effect of acid. The prepared Pd/C$_{HS}$ was characterized by Fourier-transform infrared spectroscopy (FTIR), scanning electron microscope (SEM) and transmission electron microscope (TEM). It was found that the palladium nanoparticles bound to the carboxyl groups of the activated carbon surface were distributed uniformly, the average diameter of Pd nanoparticles was about 1.93±0.44 nm.

Figure 8:
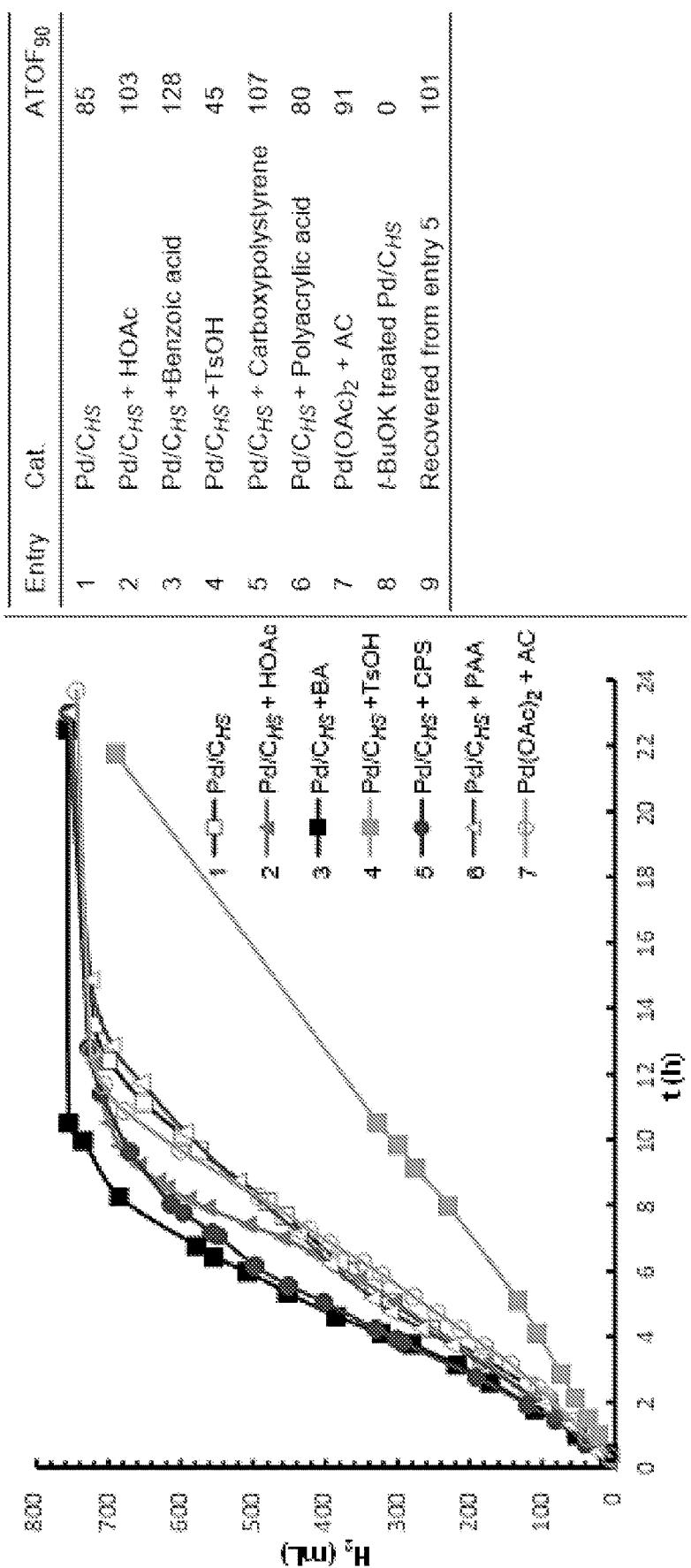
FIG. 8 depicts the effect of the addition of acid on the dehydrogenation process. The right panel depicts for each experiment, the Average Turnover Frequency within 90% yield ($ATOF_{90}$) (mol $H_2$ per mol Pd per hour). The left panel depicts the time-dependent $H_2$ release curves for 2,6-dimethylpiperidine dehydrogenation catalysed by Pd/C (with and without other additives. Experiments Conditions: [Pd] (0.3 mol %), acid (0.6 mol %), 2,6-dimethylpiperidine (10 mmol), oil bath (170° C.). (1) reaction without additional acid (hollow square □). (2) reaction with acetic acid (solid grey triangle ▲). (3) reaction with BA: benzoic acid (solid black square ■). (4) reaction with p-TsOH: 4-methylbenzenesulfonic acid (solid grey square ■). (5) reaction with CPS: carboxypolystyrene (solid dot ●). (6) reaction with PAA: polyacrylic acid (hollow triangle Δ). (7) reaction with $Pd(OAc)_2$ and activated carbon (hollow dot ○).

Then, the catalytic activity of Pd/C$_H$S for 2,6-dimethylpiperidine dehydrogenation was tested; the time-dependent H$_2$ release curves and average turnover frequency within 90% yield (ATOF$_{90}$=85 mol H$_2$ per mol Pd per hour) are shown in FIG. 8. The ATOF$_{90}$ of using Pd/C$_H$S as a catalyst is close to that of the Pd(OAc)$_2$/activated carbon system (ATOF$_{90}$=91).

The effect of acid was investigated by adding 2 equivalents (with respect to Pd) of acetic acid (pK$_a$=4.76), benzoic acid (pK$_a$=4.20), 4-methylbenzenesulfonic acid (pK$_a$=1.99), carboxypolystyrene (monomer pK$_a$=4.35) or polyacrylic acid (pK$_a$=4.75) into the reaction mixture (FIG. 8, entries 2-6). Acetic acid, benzoic acid, and the polymer carboxypolystyrene showed positive effects on the dehydrogenation process, resulting in ATOF$_{90}$s of 103, 128 and 107, respectively. Using polyacrylic acid as an additive, the ATOF$_{90}$ slightly decreased to 80, and use of the strong acid 4-methylbenzenesulfonic acid had a negative effect, resulting in the ATOF$_{90}$ decrease to 45. However, treatment of Pd/CHS with t-BuOK before use, upon which the interaction of the carboxyl groups and Pd nanoparticles might be broken by the base, the catalyst became completely inactive (FIG. 8, entry 8). These results indicate that carboxylic acids and the carboxyl group on the activated carbon surface accelerate the palladium catalyzed dehydrogenation of 2,6-dimethylpiperidine. Furthermore, Pd/CHS and carboxypolystyrene could be easily recovered by centrifugation without loss of catalytic activity (ATOF$_{90}$=101, FIG. 8, entry 9).

Figure 9A:
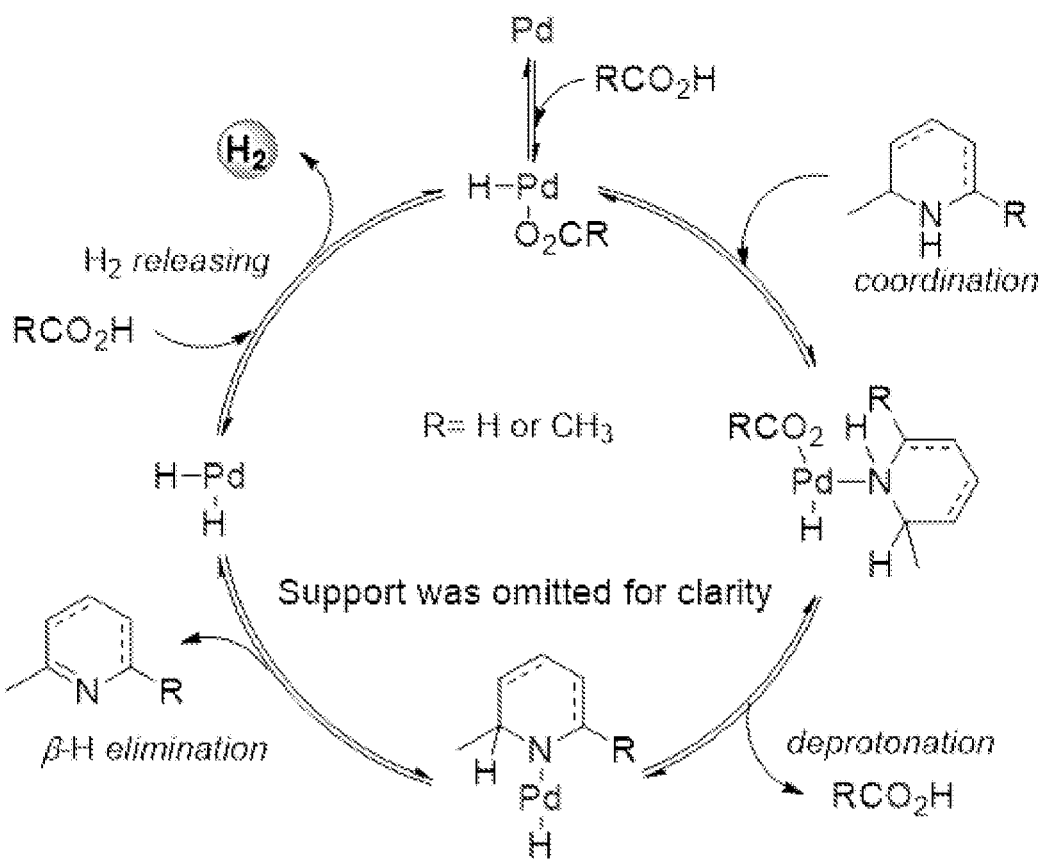
FIG. 9A-9B depict a plausible dehydrogenation mechanism (FIG. 9A); and a suggested pathway for 2-picoline and 2,6-lutidine formation (FIG. 9B). Dotted lines indicate the presence of either single bonds or double bonds.
Figure 9B:
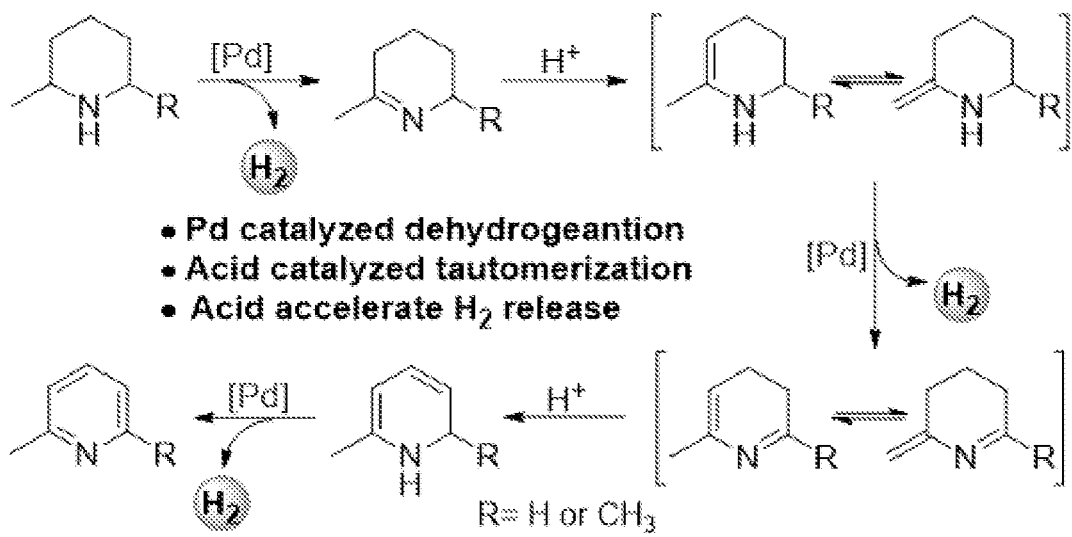

Based on the control experiments, preliminary mechanistic studies, and the literature, a plausible dehydrogenation mechanism (FIG. 9A) and pathway (FIG. 9B) of 2-picoline and 2,6-lutidine formation is proposed. Coordination of the N-heterocycle to Pd(II) nanoparticles results in an increase in the acidity of N—H group, which could be deprotonated by the counter carboxylate anions of Pd$_n^{2+}$ to generate an amido-palladium species and carboxylic acid (FIG. 9A). Then β-hydride elimination occurs to generate an imine and a palladium hydride species. Finally, with the assistance of carboxylic acid, H$_2$ is released and the active catalyst Pd$_n^{2+}$ is regenerated. Another role of the carboxylic acid in the reaction system is acceleration of the tautomerization of imines to key intermediate enamines (FIG. 9B). The cascade steps of dehydrogenation and tautomerization produce the final H$_2$-lean product 2-picoline or 2,6-lutidine and H$_2$.

Experimental Details:

Procedure for treating Pd/C$_H$S with t-BuOK: In a glovebox, Pd/CHS (43 mg, [Pd]=0.03 mmol), t-BuOK (16.8 mg, 0.15 mmol) and THF (1 mL) were added to a Schlenk tube. After stirring at room temperature for 12 hours, the catalyst was separated by centrifugation, washed with THF (1 mL×2), and dried under vacuum.

Example 6

2-Methylpiperidine as a LOHC System
Reversible Interconversion of 2-methylpiperidine and 2-picoline

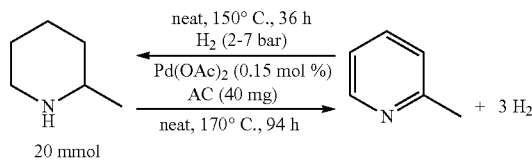

Dehydrogenation: In a glovebox, 2-methylpiperidine (20 mmol), Pd(OAc)$_2$ (6.7 mg, 0.03 mmol) and activated carbon (40 mg) were added to a Schlenk tube. The Schlenk tube was equipped with a condenser, which was connected to a gas collection system (FIG. 3). The solution was refluxed with stirring in an open system. When no more gas was generated, the reaction was stopped. The yield of H$_2$ (91%) was calculated based on H$_2$ volume (1344 mL) with respect to full conversion of 2-methylpiperidine to 2-picoline (Table 11). After cooling to room temperature, the Schlenk tube was brought into a glovebox, and the mixture was transferred into a 90 mL Fisher-Porter tube for hydrogenation.

Hydrogenation: The Fisher-Porter tube was taken out of the glovebox, pressurized with 7 bar of H$_2$, and heated at 150° C. After 6 hours, the H$_2$ pressure decreased to 2 bar and the reaction mixture was cooled to room temperature, then pressurized with H$_2$ (7 bar) for the second time, and heated at 150° C. for another 6 hours. The Fisher-Porter tube was pressurized with H$_2$ (7 bar) for the third time and heated at 150° C. for 12 hours. After the fourth pressurizing (7 bar), the Fisher-Porter tube was heated at 150° C. for the last 12 hours. Then, the Fisher-Porter tube was cooled to room temperature, and hydrogen was released carefully, 950 mg of n-heptane was added as an internal standard, a sample of 100 μL was taken (diluted with Et$_2$O) for GC analysis (Table 12).

TABLE 12

Interconversion of 2-methylpiperidine and 2-picoline

| | Conversion (%) | 2-methylpipridine (%) | 2-picoline (%) | H$_2$ mL (%) |
|---|---|---|---|---|
| Dehydrogenation | 98$^b$ | — | 81$^b$ | 1344 (91)$^c$ |
| Hydrogenation | 100$^b$ | 90$^a$ (94$^b$) | — | — |

$^a$GC yield, using n-heptane as an internal standard.
$^b$Determined by GC, based on the peak area.
$^c$Yield of H$_2$ was calculated on basis of H$_2$ volume with respect to full conversion of 2-methylpiperidine to 2-picoline (60 mmol of H$_2$, 1480 mL at 28° C.).

Example 7

2,6-dimethylpiperidine as a LOHC System
Reversible Interconversion of 2,6-dimethylpiperidine and 2,6-lutidine and Catalyst Reuse

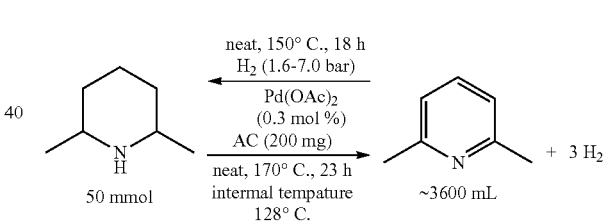

Dehydrogenation: 2,6-Dimethylpiperidine (50 mmol), Pd(OAc)$_2$ (33.6 mg, 0.15 mmol) and activated carbon (200 mg) were added to a Schlenk tube. The Schlenk tube was equipped with a condenser, which was connected to a gas collection system (FIG. 3). The solution was refluxed with stirring in an open system for 23 hours. After cooling to room temperature, the Schlenk tube was brought into a glovebox, and the mixture was transferred into a 90 mL Fisher-Porter tube for hydrogenation.

Hydrogenation: The Fisher-Porter tube was taken out of the glovebox, pressurized with 7 bar of H$_2$ (the first time) and heated at 150° C. After 6 hours, the H$_2$ pressure decreased to 1.6 bar and the Fisher-Porter tube was cooled to room temperature and pressurized with H$_2$ (7 bar) for the second time. After 8 times pressurization and heating, the Fisher-Porter tube was cooled to room temperature, hydrogen was released carefully, then the tube with the reaction mixture was taken into the glovebox, and the mixture was transferred to a Schlenk tube for dehydrogenation.

Catalyst Reuse: After three times dehydrogenation and two times hydrogenation, the solid catalyst was separated via centrifugation (4000 rpm for 40 mins), and was washed with n-pentane (4 mL×4), then dried under vacuum for 8 hours. The recovered catalyst was used for the fourth and fifth dehydrogenation.

Figure 12:
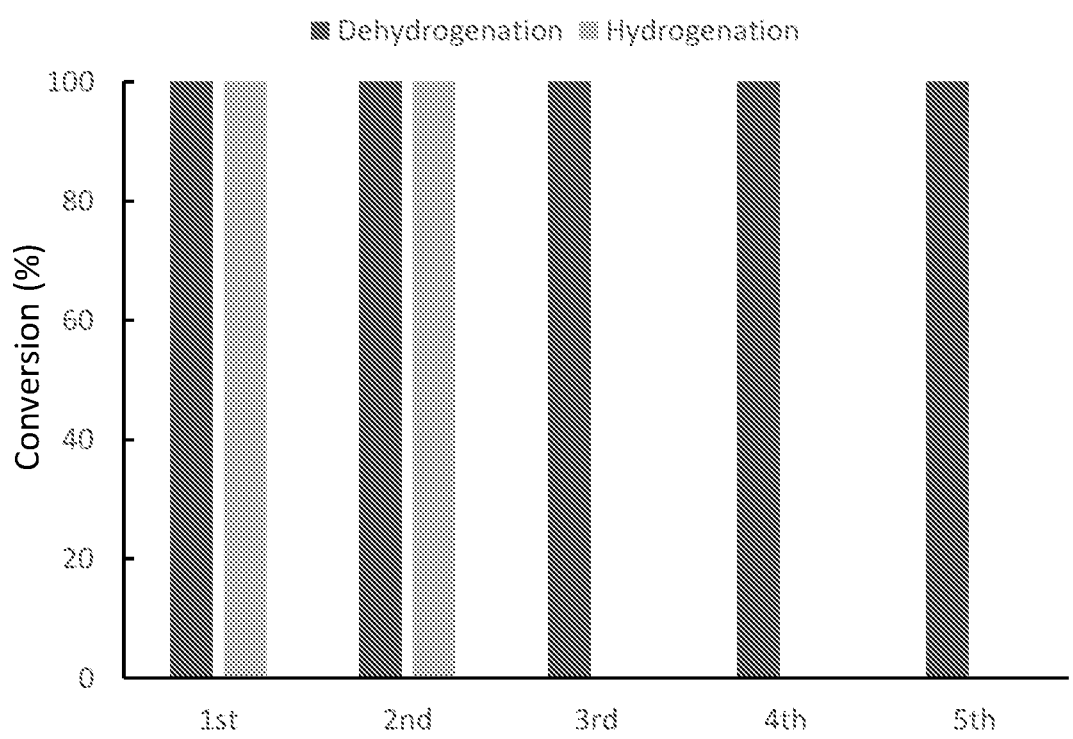
FIG. 12 depicts catalyst conversions percentage in a 2,6-dimethylpiperidine as a LOHC system providing a reversible interconversion of 2,6-dimethylpiperidine and 2,6-lutidine, when the catalyst is reused as exemplified in Example 7.

FIG. 12 demonstrates 100% conversion of the catalyst in the following reversible process steps dehydrogenation-→hydrogenation→dehydrogenation-→hydrogenation→dehydrogenation, wherein the catalyst was not recycled and was used as is. Following the last step of the dehydrogenation, the catalyst was recycled and was used again for additional two dehydrogenation steps (the catalyst was recycled between each of the last dehydrogenation steps). In all processes the catalyst demonstrated 100% conversion.

Example 8

Preparation of Catalyst Pd/C$_{HS}$

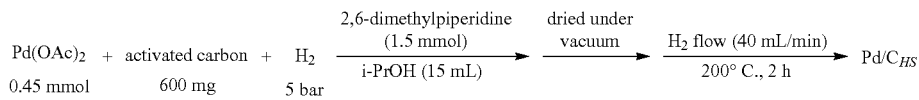

In a glovebox, Pd(OAc)$_2$ (100.8 mg), activated carbon (600 mg, Darco@KB, surface area: 1500 m$^2$/g, pH$_{PZC}$=4.25), 2,6-dimethylpiperidine (170 mg), and i-PrOH (15 mL) were added to a 90 mL Fisher-Porter tube. The Fisher-Porter tube was pressurized with 5 bar of H$_2$, and the mixture was stirred at 120° C. for 5 hours, then stirred at room temperature for another 5 days. The solvent was removed under vacuum and the residue was treated with H$_2$ flow (40 mL/min) at 200° C. for 2 hours. The obtained catalyst Pd/C$_H$S must be kept under inert atmosphere.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A reversible hydrogen loading and discharging system comprising: at least one N-heterocycle; one transition metal catalyst, or transition metal catalyst precursor; and a catalytic amount of at least one weak acid, wherein the system does not comprise any solvent and is functional under mild temperatures and pressures; wherein the catalytic amount of the at least one weak acid is between 0.01 w/w %-35 w/w % based on the N-heterocycle.

2. The system according to claim 1, wherein the N-heterocylce is a H$_2$-rich compound, an H$_2$-lean compound or a combination thereof, and wherein the H$_2$-rich compound is a substituted or unsubstituted piperidine, and the H$_2$-lean compound is a substituted or unsubstituted pyridine.

3. The system according to claim 2, wherein both the substituted or unsubstituted piperidine and the substituted or unsubstituted pyridine are liquids at room temperature.

4. The system according to claim 2, wherein the substitution of said substituted piperidine and/or pyridine is at least one selected from: CH$_3$, CH$_2$CH$_3$, CH$_2$F, CHF$_2$, CF$_3$, OCH$_3$, F, Cl, OH, NH$_2$, NH(CH$_3$), N(CH$_3$)$_2$, and CN.

5. The system according to claim 2, wherein the substituted or unsubstituted piperidine is selected from: piperidine, 2-methylpiperidine, 3-methylpiperidine, 4-methylpiperidine, 3,4-dimethylpiperidine 2,4-dimethylpiperidine, 2,5-dimethylpiperidine and 2,6-dimethylpiperidine.

6. The system according to claim 2, wherein the substituted piperidine is 2,6-dimethylpiperidine or 2-methylpiperidine.

7. The system according to claim 2, wherein said discharging of hydrogen is achieved by reacting said at least one substituted or unsubstituted piperidine with said at least one transition metal catalyst; thereby forming at least three hydrogen molecules and at least one substituted or unsubstituted pyridine.

8. The system according to claim 2, wherein said loading of hydrogen is achieved by reacting said substituted or unsubstituted pyridine with at least three hydrogen molecules in the presence of said catalyst; thereby forming at least one substituted piperidine.

9. The system according to claim 1, wherein the catalyst is commercially available or is generated in-situ from a catalyst precursor.

10. The system according to claim 9, wherein the catalyst precursor is selected from Pd(OAc)$_2$, PdCl$_2$, Pd(TFA)$_2$, Pd(acac)$_2$, and Pd$_2$(dba)$_3$.

11. The system according to claim 9, wherein said catalyst precursor is Pd(OAc)$_2$.

12. The system according to claim 1, wherein said transition metal catalyst is supported on insoluble matrix.

13. The system according to claim 12, wherein the insoluble matrix is selected from: activated carbon, dried acidic activated carbon, SiO$_2$, BaSO$_4$, BN, γ-Al$_2$O$_3$ or CeO$_2$.

14. The system according to claim 1, having hydrogen storage capacity of at least 4 wt %.

15. The system according to claim 14, wherein said hydrogen storage capacity is of at least 5 wt %.

16. The system according to claim 1, wherein said mild temperatures are between 50° C. and 180° C., said pressures are between 1 and 80 bar, or combination thereof.

17. The system according to claim 1, wherein said temperatures are between 130° C. and 180° C., said pressures are between 1.5 and 8 bar, or combination thereof.

18. The system according to claim 1, wherein the N-heterocycle has a wide liquid range.

19. The system according to claim 1, wherein the N-heterocycle has a melting point of below 15° C.

20. The system according to claim 1, wherein the N-heterocycle has a boiling point of above 100° C.

21. The system according to claim 1, wherein the N-heterocycle is a liquid at least between a temperature of 15° C. and 100° C.

22. The system according to claim 1, wherein said transition metal is selected from Mn, Fe, Co, Ru, Rh, Pd, Pt, Cu, Ag or any combinations thereof.

23. The system according to claim 1, wherein said transition metal catalyst is heterogeneous.

24. The system according to claim 1, wherein the transition metal catalyst is palladium on activated carbon (Pd/C).

25. The system according to claim 1, wherein the same catalyst is used both for hydrogen loading (hydrogenation) and hydrogen discharging (dehydrogenation) processes.

26. The system according to claim 1, wherein said acid is selected from: acetic acid, benzoic acid, carboxypolystyrene and polyacrylic acid.

27. The system according to claim 1, wherein the catalyst or the catalyst precursor is present in an amount of between 0.05% to 5% w/w.

28. A reversible process for the storage and release of hydrogen ($H_2$) upon demand comprising the steps of:
   a. when hydrogen storage is desired, reacting a substituted or unsubstituted pyridine derivative with molecular hydrogen ($H_2$) in the presence of a first catalyst, under conditions sufficient to generate a substituted or unsubstituted piperidine derivative; and
   b. when hydrogen release is desired, reacting a substituted or unsubstituted piperidine derivative with a second catalyst and a catalytic amount of at least one weak acid, under conditions sufficient to release hydrogen, thereby generating the corresponding substituted or unsubstituted pyridine derivative and molecular hydrogen ($H_2$);
   wherein the first and the second catalyst are the same, the process does not comprise any solvent, and the process is carried out under mild temperatures and hydrogen pressures;
   wherein the catalytic amount of the at least one weak acid is between 0.01 w/w %-35 w/w % based on the N-heterocycle.

29. The process according to claim 28, wherein both the substituted or unsubstituted piperidine and the substituted or unsubstituted pyridine are liquids at room temperature.

30. The process according to claim 28, wherein the substituted or unsubstituted piperidine is selected from: piperidine, 2-methylpiperidine, 3-methylpiperidine, 4-methylpiperidine, 3,4-dimethylpiperidine 2,4-dimethylpiperidine, 2,5-dimethylpiperidine and 2,6-dimethylpiperidine.

31. The process according to claim 28, wherein the catalyst is palladium on activated carbon (Pd/C).

32. The process according to claim 28, wherein the catalyst is commercially available or is generated in-situ from a catalyst precursor.

33. The process according to claim 32, wherein the catalyst precursor is selected from $Pd(OAc)_2$, $PdCl_2$, $Pd(TFA)_2$, $Pd(acac)_2$ and $Pd_2(dba)_3$.

34. The process according to claim 28, wherein said acid is selected from: acetic acid, benzoic acid, carboxypolystyrene and polyacrylic acid.

35. The process according to claim 28, wherein the catalyst or the catalyst precursor is present in an amount of between 0.05% to 5% w/w.

* * * * *